(12) United States Patent
Danilov et al.

(10) Patent No.: US 12,032,559 B2
(45) Date of Patent: Jul. 9, 2024

(54) LOG DATA MANAGEMENT IN A STREAMING DATA STORAGE SYSTEM

(71) Applicant: EMC IP Holding Company LLC, Hopkinton, MA (US)

(72) Inventors: Mikhail Danilov, Saint Petersburg (RU); Andrei Paduroiu, Bellevue, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 263 days.

(21) Appl. No.: 17/323,417

(22) Filed: May 18, 2021

(65) Prior Publication Data

US 2022/0374417 A1 Nov. 24, 2022

(51) Int. Cl.
*G06F 16/215* (2019.01)
*G06F 16/23* (2019.01)

(52) U.S. Cl.
CPC ........ *G06F 16/2379* (2019.01); *G06F 16/215* (2019.01)

(58) Field of Classification Search
CPC ......... G06F 16/215; G06F 16/24; G06F 16/23
See application file for complete search history.

(56) References Cited

U.S. PATENT DOCUMENTS

| | | | |
|---|---|---|---|
| 9,298,707 B1* | 3/2016 | Zhang | G06F 11/1453 |
| 9,715,505 B1* | 7/2017 | Mondal | G06F 16/162 |
| 10,311,042 B1* | 6/2019 | Kumar | G06F 16/2365 |
| 11,249,655 B1* | 2/2022 | Chen | G06F 11/1484 |
| 2018/0004745 A1* | 1/2018 | Finkelstein | G06F 16/2255 |
| 2018/0332325 A1* | 11/2018 | Kaitchuck | H04L 9/0643 |
| 2020/0250210 A1* | 8/2020 | Busjaeger | G06F 16/328 |
| 2021/0019255 A1* | 1/2021 | Akin | G06F 12/0246 |
| 2022/0197861 A1* | 6/2022 | Wang | G06F 16/22 |

* cited by examiner

*Primary Examiner* — Maher N Algibhah
(74) *Attorney, Agent, or Firm* — Amin, Turocy & Watson, LLP

(57) ABSTRACT

The described technology is generally directed towards fine-grained data expiration to reduce storage capacity used in a streaming data storage system. Segments of events are scanned, with each event's payload evaluated to determine whether that event is expired or unexpired. For example, for a log event, an expiration period can be determined based on the event creation time and the event logging level, both of which are typically within the log event's payload. Unexpired events are copied to a new destination segment that replaces the original, scanned source segment; the expired events are deleted when the source segment is deleted, reclaiming storage capacity used by the expired events. Also described is maintaining and using segment and chunk metadata to bypass individual event processing when the metadata indicates that the chunk contains only expired events and can be safely deleted.

20 Claims, 17 Drawing Sheets

LOG DATA MANAGEMENT IN A STREAMING DATA STORAGE SYSTEM

BACKGROUND

Contemporary data storage systems store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. One stream may be divided into one or more segments, with an event appended to a segment based on a routing key associated with the event that determines to which segment the event data is written.

Although a stream is potentially unbounded, storage resources are finite. Thus, to free up storage capacity, older events in a data stream can be deleted from a head (back) of a stream. However, deleting older event data is not straightforward, as some older data can remain more useful than other older data. For example, if a policy is configured to delete older data based on size or age so that the data do not occupy too much storage capacity (e.g., disk space), still useful data can be lost. If instead the policy is configured to delete data based on age, a lot of no longer needed data is retained, whereby a considerable amount of storage capacity needs to be reserved.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
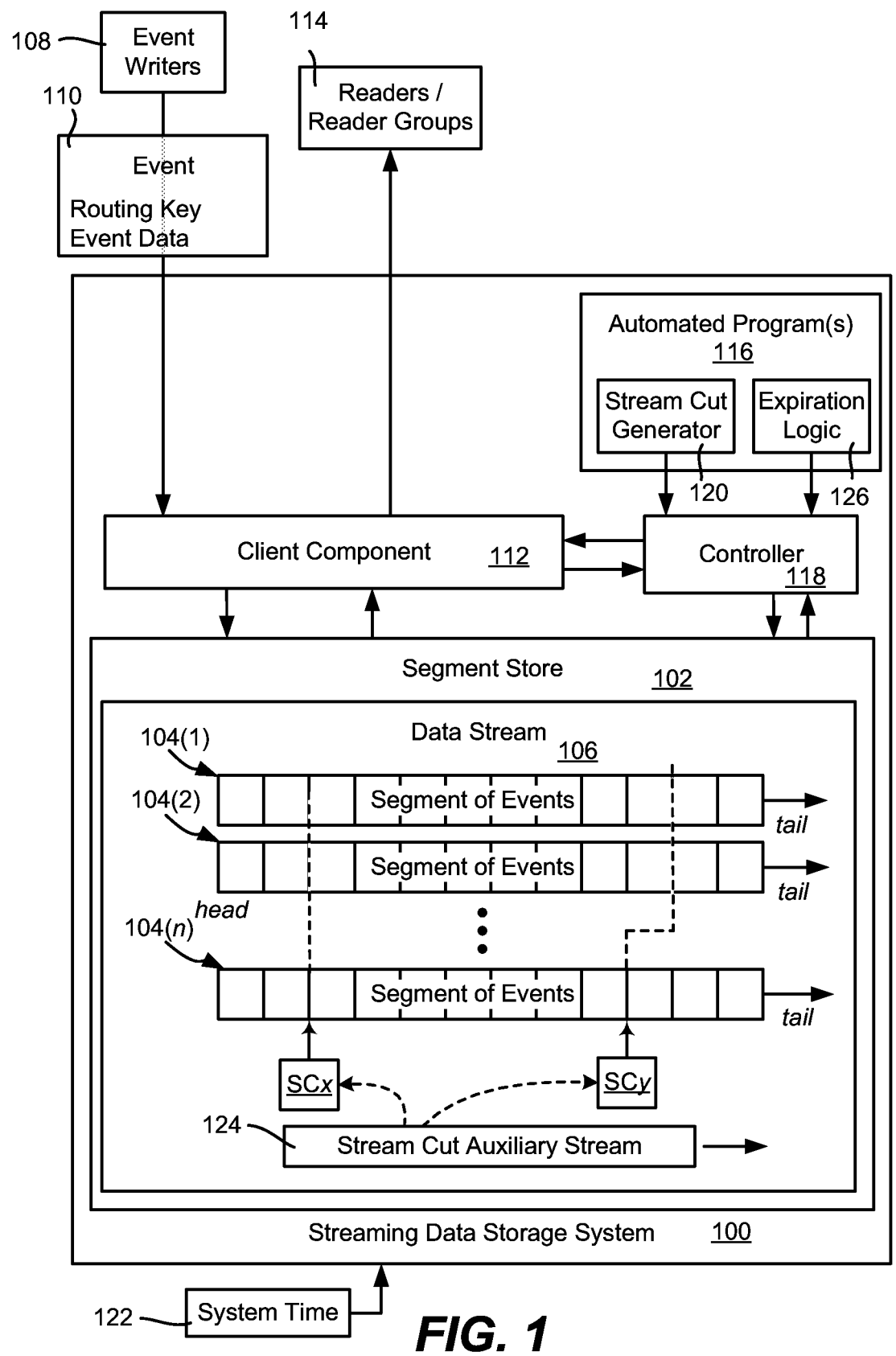
FIG. 1 is a block diagram representation of example components and data—related operations in a streaming data storage system that facilitates fine-grained data expiration of events, in accordance with various aspects and implementations of the subject disclosure.

The technology described herein is generally directed towards automatic time-based data expiration for streaming data storage systems, in which expiration policy can be defined at the event level based on event information, including information within the event data (payload) itself. For example, the data of log events, without adding additional metadata, can contain sufficient information by which one log event can be determined to be unexpired, while another (e.g., subsequent) log event can be determined to be expired. The technology is thus fine-grained with respect to data expiration.

In general, the technology described herein is based on a combination of stream data expiration and stream data compaction. Expiration logic, e.g., a system process, scans older source stream segments, finds stream events in those segments to retain because their expiration period is not over, and copies these unexpired events to new destination segments. The new segments replace the older, scanned segments in the data stream, after which the older segments can be deleted, releasing storage capacity. Events that have expired are deleted because they are not copied to the new destination stream segments. The resultant new replacement segments are (typically) relatively much smaller than the older source stream segments, whereby the total footprint of a data stream is significantly reduced after expiration scanning.

It should be understood that any of the examples herein are non-limiting. As one example, the technology is described using log event data streams, however other use cases for such fine-grained data expiration are numerous, and the technology can be applied to such other use cases. As another example, while virtually any stream-based data storage system may benefit from the technology described herein, one implementation uses a "stream cut object" or simply a "stream cut" that refers to a specific position in the segment of a data stream on an event boundary; expired data is deleted from a stream cut boundary (rather than arbitrarily). Other data stream storage systems can use a similar concept, or can use timestamped data; notwithstanding, as will be understood, the technology described herein can be applied to any stream-based data storage mechanism. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes a segment store 102 that maintains and manages segments 104(1)-104(n) of at least part of a data stream 106. Note that the segments 104(1)-104(n) can be distributed among segment store instances, such as distributed among different nodes of a node cluster.

In general, an event writer 108 such as a streaming application program sends data writes comprising events 110 into the streaming data storage system 100 via an application programming interface (API) of a client component 112 in one implementation. As described herein, an event of events 110 comprises a routing key and the event data (payload). Also shown in FIG. 1 is a reader 114 or reader group (organized multiple readers that coordinate reading a data stream's segments) that consume and process the stored events in some way.

As described herein, the streaming data storage system 100 can include (or be coupled to) automated programs 116. As described herein, the automated programs 116 can be operated by or incorporated into a controller 118, and can, for example, operate on numerous nodes/distributed segment stores of a node cluster.

As described herein, the streaming data storage system 110 can include (or be coupled to) automated programs 116. As described herein, the automated programs 116 can be operated by or incorporated into a controller 118, and can, for example, operate on numerous nodes/distributed segment stores of a node cluster.

One such automated program, shown as a stream cut generator 120, automatically generates stream cuts for a data stream, such as periodically; (the frequency of automatically generated stream cuts can be specified by an administrator or the like). In general, a stream cut specifies a position in a data stream at an event boundary, and can be associated with a timestamp or the like, e.g., obtained via system time 122; (note that the correct system time 134 can be obtained via use of the Network Time Protocol (NTP)). Each stream cut tracks event boundaries (e.g., position offsets) within each data segment 104(1)-104(n). As described herein, the stream cuts for a stream can be considered a series of stream cuts.

In one or more implementations, the stream cuts may be maintained as an auxiliary system stream 124 associated with the segments 104(1)-104(n) of the data stream 106. Note that although not explicitly shown in FIG. 1, an event writer can also request association of a stream cut with a data stream.

Another automated program comprises expiration logic 126, which as described herein scans the segments 104(1)-104(n) of the data stream 106 to locate unexpired events, and copy those unexpired events to new destination segments. The new destination segments replace the original segments. This basically compacts the segments, and can thus significantly reduce the amount of data storage used for storing the retained events.

One type of event that is commonly used with data streams is a log event. A typical log event comprises fields of data such as date&time, cluster.node, component, level, and text. The date&time field contains the creation data and time for a log entry. In a clustered environment, there is also a cluster node (cluster.node) comprising an identifier or the like of the cluster node that initiated logging. Further, a component that initiates logging identifies itself in its log entries, such as the controller 118, the segment store 102, the client component 112 and so forth.

The level field, for a log event, comprises a logging level, such as a numeric value, but alternatively a string, that defines the type of a log event. Although different logging systems may use different levels, most logging systems have levels indicating whether a log event is a Debug, Status, Warning, or Error type of log event, as one non-limiting example. These logging levels can have different expiration policies (periods) associated with the event, such as the following (non-limiting) logging levels:

Debug log entries: 3 days
Status log entries: 1 week
Warning log entries: 2 weeks
Error log entries: 1 month.

The main payload of each log event typically contains a human-readable piece of text that a knowledgeable user can evaluate. By way of example, consider that a typical use-case for logs in the field is to facilitate Root-Cause Analysis (RCA) of issues. However, because of stream truncation, it is a common problem that when a service engineer connects to a system to see what was wrong at the moment the issue happened, the service engineer sees that the needed logs have been executed (deleted) in accordance with the log expiration policy, e.g., based on a log rotation policy that ensures that logs do not occupy too much disk space/storage capacity. An existing solution is to block stream truncation based on the longest time of any event, e.g., one month in the above example; however this results in a potentially huge log stream footprint which is undesirable. Creating separate data streams for events with different levels, such as one stream per logging level, is not a practical solution, as doing so implies additional and non-trivial efforts on uniting data from different streams to be presented to a human, and is virtually impossible to guarantee the correct order of events when they have been written to different streams.

The technology described herein uses intelligent log data processing to manage data expiration in (log) streams. To this end, the expiration of a given log entry is based (in part) on its logging level. Thus, unlike existing stream truncation, different types of events, e.g., based on their associated logging levels, can be retained for different expiration periods.

In one implementation, the respective expiration periods associated with the respective logging levels are user configurable (e.g., by an administrator responsible for the data stream or system), which provides a useful tradeoff between how long to keep information versus how much storage capacity is needed. Selective event expiration based on data (a logging level) within each event provides a significant advantage over having to keep a log data stream based on the longest time likely needed for the full set of events, as less storage capacity/disk space is needed via the technology described herein.

The expiration logic technology described herein, which can be implemented as a periodic system process, scans old source stream segments from the data stream head, and basically compacts those segments by copying only the unexpired events to new segments and deleting the old segments. There is no need to scan the stream to its tail, as the expiration logic can stop when it detects events that have to remain because they are within the minimal expiration period set forth for the data stream. In the above log data stream example, the scanning can be stopped when events that were created less than three days ago (based on the smallest expiration period of three days for debug log entries) are detected.

Note that a data stream can be automatically scaled in real time to increase or decrease the number of active segments based on the current event ingestion rate/size. Each such "auto-scaling" change in the number of active segments corresponds to an "epoch." The set of predecessor segments and the corresponding set of successor segments are tracked for each epoch.

Because stream auto-scaling is for stream data processing in real-time mode, one stream epoch with a fixed number of destination segments is sufficient for expiration-based stream compaction as described herein. The number of destination segments can, for example, be the number of segments with which the data stream was created with, or some other number, such as the number of segments that existed at the head of the data stream before scanning. Note that the expiration logic changes the stream past, whereby the stream-cuts created for the processed part of the stream need to be invalidated/updated. Note further that unlike existing compaction techniques, the technology described herein works with individual events, whereby there is no need for a (typically) large memory buffer for a routing keys' map.

Figure 2A:
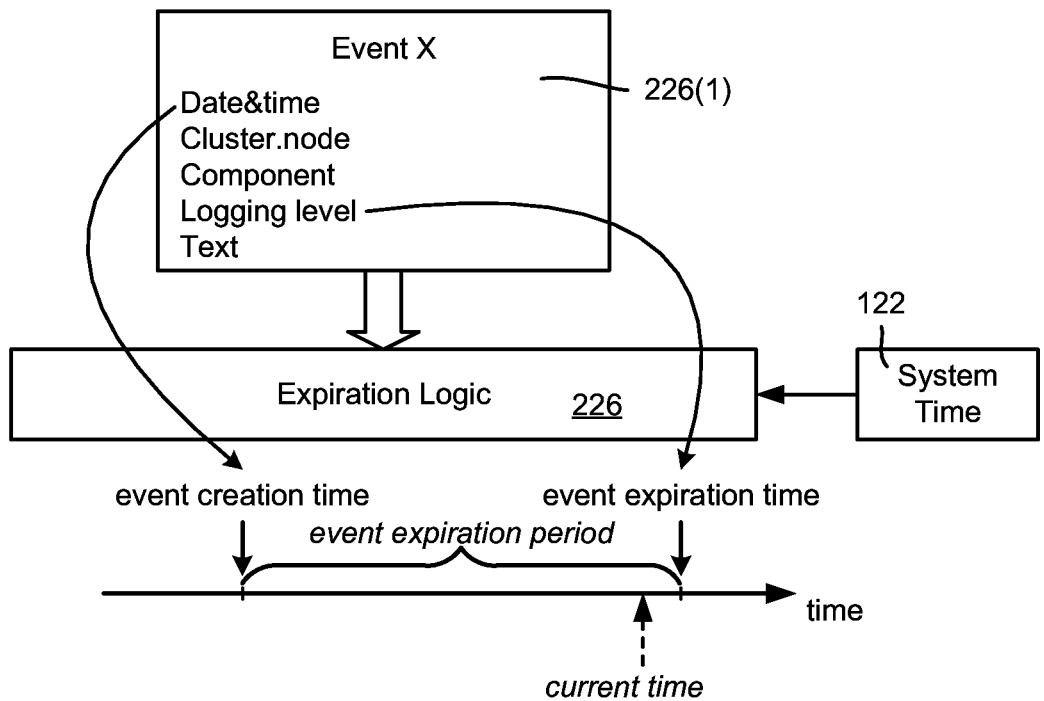
FIG. 2A is an example representation of how an unexpired event has an event expiration time determined for the event, in accordance with various aspects and implementations of the subject disclosure.
Figure 2B:
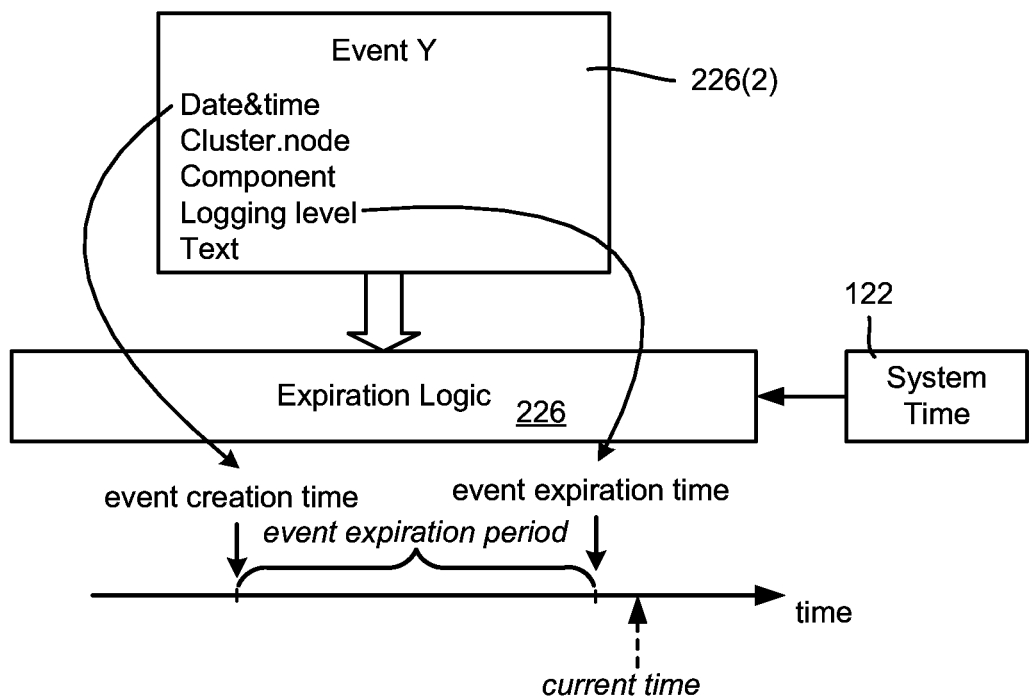
FIG. 2B is an example representation of how an expired event has an event expiration time determined for the event, in accordance with various aspects and implementations of the subject disclosure.

In one implementation, the fine-grained expiration of events as described herein does not need additional per-event metadata, but rather extracts the needed information from the event data of each event. As shown in FIGS. 2A and 2B, an implementation of the expiration logic 226 uses the event creation time and an event expiration period, along with the current time, to determine whether an event is unexpired and is to be copied to a new destination segment, or whether the event is expired. The expiration logic 226 also determines an event routing key to identify the event's destination stream segment.

In the example log stream, the information the expiration logic 226 uses is already present in the log event entry's data. Namely, the event creation time can be extracted from the log entry's date&time field, and the event expiration period depends on the event's logging level (e.g., one month for an error); the logging level can be extracted from the log entry as well. As for the routing key, the combination of the cluster.node and component fields is sufficient to use as a routing key for log events. The expiration logic 226 can thus extract the needed data from each log event's already existing data fields in this example.

Figure 3:
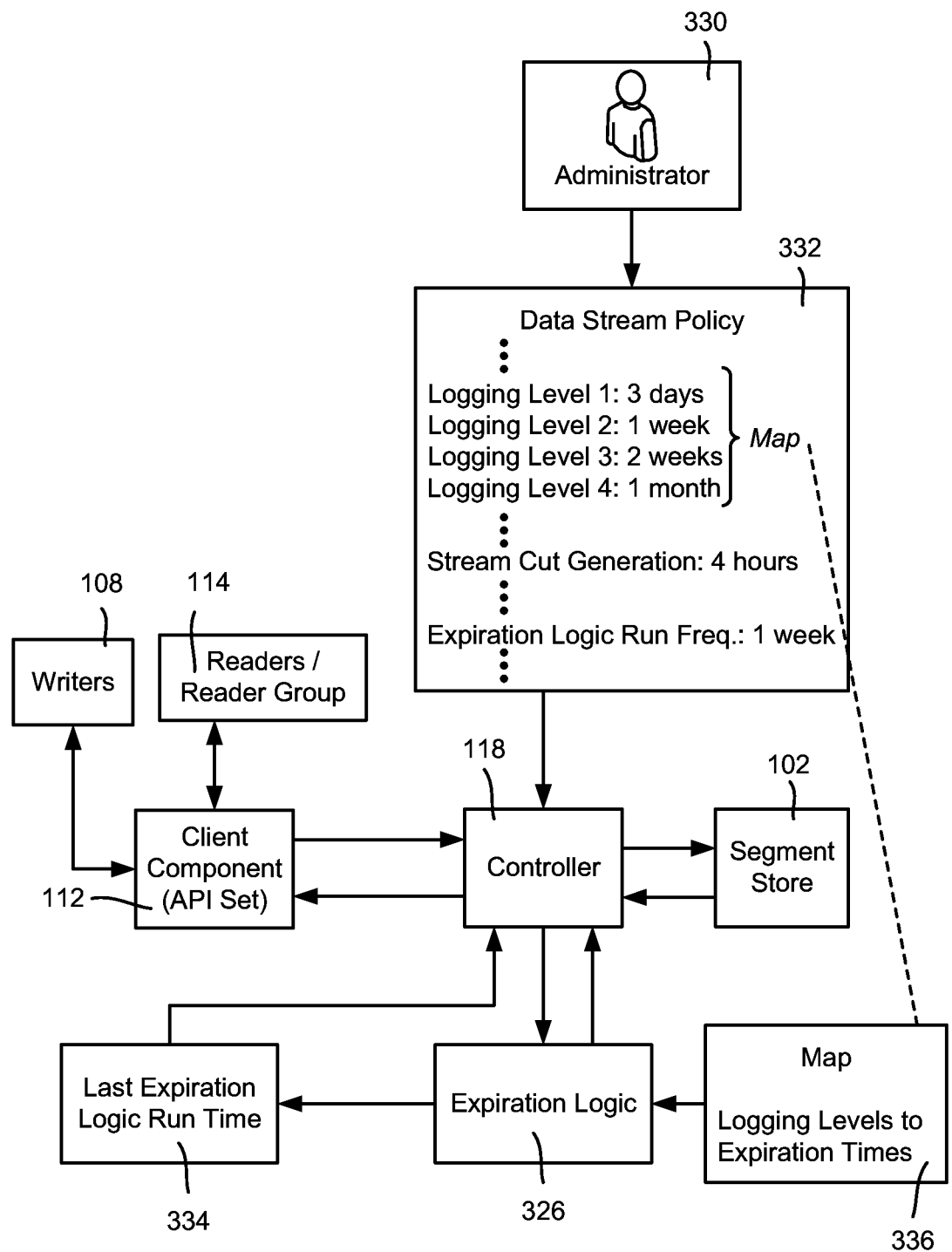
FIG. 3 is a representation of example components and data structures that facilitate fine-grained data expiration, in accordance with various aspects and implementations of the subject disclosure.

In the example of FIG. 2A, it can be seen that an event X, labeled 228(1), has an event expiration period of the event creation time (date&time field) plus the logging level-based expiration time. The logging level-based expiration time can be obtained from data stream policy data (as shown in FIG. 3), e.g., as set by an administrator or in some other suitable way. In FIG. 2A, the event expiration time is in the future relative to the current time, that is, the current time falls within the event expiration period, and thus the event 228(1) is unexpired and needs to be retained, by copying the event 228(1) to a destination segment selected via the routing key composed for it.

In contrast, in the example of FIG. 2B, it can be seen that an event Y, labeled 228(2), has an event expiration period in the past relative to the current time, whereby the event 228(2) is expired. Again, the event creation time (date&time field) plus the logging level-based expiration time determines the event expiration period. Because this event 228(2) is expired, the event 228(2) is not copied to a destination segment, and its space is thus reclaimed when the segment containing the event 228(2) is deleted.

It should be noted that in the log-related examples of FIGS. 2A and 2B, each event's payload data provides sufficient information needed to determine whether the event is expired. In other scenarios in which such needed information cannot be extracted/calculated from the events' payload, the event writer can provide (explicitly add) additional per-event metadata to be stored in the events' payloads for fine-grained expiration purposes as described herein.

FIG. 3 shows example components and data structures that facilitate event expiration based on logging levels. In general, an administrator 330 or the like sets data stream policy 332. As represented in FIG. 3, this can include the respective logging levels and their respective expiration times, the frequency of stream cut generation, and how often to run the expire logic (expiration logic run frequency, although alternatively this interval can be determined by an algorithm or the like).

In general, the controller 118 triggers an instance of the expiration logic 326, such as periodically. For example, the expiration logic can maintain its last run time (block 334), and the controller 118 can evaluate this plus the run frequency interval (which can be changed at any time by the administrator 330) versus the current time to determine when to run the logic.

When run, the expiration logic instance 326 can obtain (e.g., via the controller 118) a map 336 of the logging levels-to-expiration times. Obtaining such a map 336 per run can be more efficient than reading the policy 332 directly, and moreover, can prevent a change in the policy from changing the logging levels-to-expiration times in the middle of an expiration run, which can lead to lost events.

More particularly, in a log data stream, a user (administrator) or the like defines in data stream policy what the supported logging levels are (e.g., debug, warn, status, error) and their associated respective expiration times. These are defined outside of the events themselves because a user may choose to adjust the expiration times for each level over the course of time. In other words, per-data stream metadata (maintained by the controller) can be enhanced with a corresponding log level-to-expiration time map 336 that defines the log levels supported. Optionally, the map 336 may also define a default expiration time, in case events are received that do not map to any predefined log level.

Note that in FIG. 3, a streaming data storage system having three main components are shown, namely the client component (API Set) 112, the controller 118 and a segment store 102. The client component 112 provides streaming applications with APIs to the system, while the controller 118 is a coordinator. Each segment store instance 102 is stream-agnostic, and deals with managing segments. As such, in one implementation the expiration logic 326 can be incorporated into a background system processor component, e.g., used for background system processes that span across multiple segments and/or streams; (the segment store deals with individual segments, while streams are composed of many segments spread across many segment stores, and thus it is generally not feasible to run such processes on a single segment store instance). Therefore, in one implementation the expiration logic 326 interacts with the controller and segment store instances to execute the expiration logic.

Figure 4:
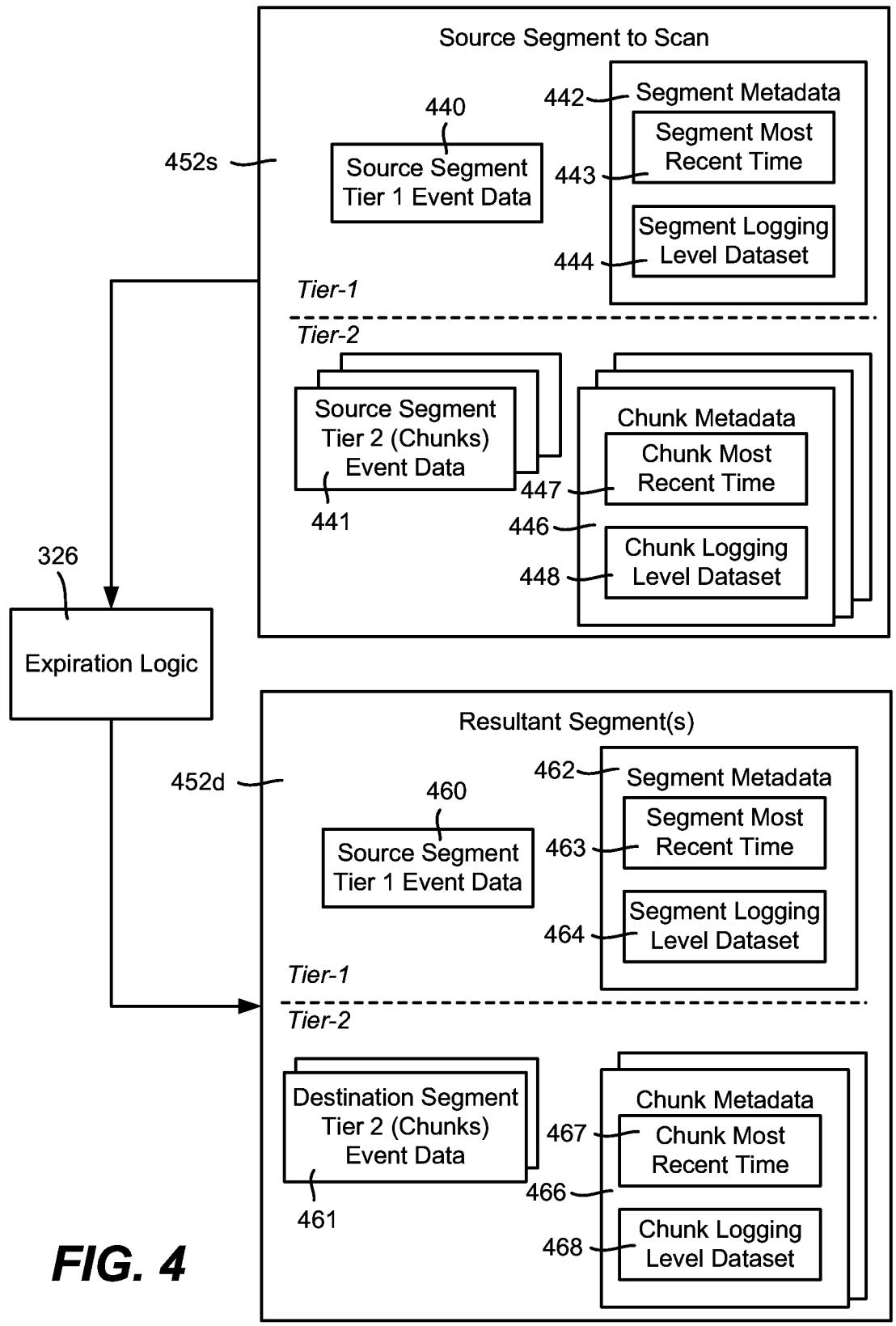
FIG. 4 is a representation of example components and data structures that facilitate fine-grained data expiration of a source segment into resultant segment(s), in accordance with various aspects and implementations of the subject disclosure.

Turning to FIG. 4, in a typical streaming data storage system, a significant part of the data resides in slower to access, cheaper long-term Tier-2 storage, with only a small amount maintained in faster, more expensive Tier-1 storage. A segment's event data 440 is moved from Tier-1 storage to Tier-2 storage, e.g., based on size-based and/or time-based policy, which is generally user configurable. As represented in the segment of FIG. 4, a segment's events in Tier-2 storage are stored in chunks 441, comprising any suitable data structure such as a file, object and so forth; that is, Tier-1 segment events are moved into tier-2 chunks, preserving the event order within a chunk and throughout multiple chunks. As can be readily appreciated, although only one source segment 452 is shown in FIG. 4, the other segments that make up a data stream are similarly arranged.

Note that in additional to scanning Tier-2 segments as described herein, it is possible to scan and process a segment's Tier-1 events to maintain only the unexpired Tier-1 events in Tier-1 storage. However, in most practical implementations, the expiration time of any event in the system is greater than the time to move the event to move from Tier-1 storage to Tier-2 storage. Thus, the technology described herein focuses on processing events that have already been written to Tier-2 storage; (the expiration logic can stop when the "tail" of Tier-2 data has been reached, for example).

As shown in FIG. 4, in addition to the event data, at least some of a segment's metadata 442 is maintained as chunk metadata 446. More particularly, when reclaiming storage capacity based on expired events as described herein, (as well as in other situations), it is generally much more efficient to avoid having to read and process stream data stored in Tier-2 storage whenever possible to do so. As will be seen, metadata-based processing can be used for cases like processing log streams to make the expiration more optimal.

To this end, the metadata of a segment's Tier-1 events can include a segment most recent time 443 comprising a timestamp indicating the numerically highest creation time of any event in the segment. The metadata of a segment's Tier-1 events can also include a logging level dataset 444 comprising a set of distinct logging levels encountered throughout the Tier-1 events in the segment; (the logging levels dataset is expected to be a finite and small set.

Similarly, the metadata 446 of a segment's Tier-2 events can include a per-chunk most recent time 447 comprising a timestamp indicating the numerically highest creation time of any event in that chunk. The metadata of a segment's Tier-2 events can also include a per-chunk logging levels dataset 448 comprising a set of the distinct logging levels encountered throughout a chunk.

Thus, certain system metadata can be associated with each chunk of stream data stored to Tier-2, and that metadata can be leveraged to often avoid having to read at least some of the Tier-2 chunks. This includes the most recent creation time (block 447) among the events within the chunk, and the logging level dataset 448, from which the longest expiration period among the logging levels present in the chunk's events can be ascertained.

When the expiration logic 326 reaches a chunk of stream (segment) data, the expiration logic 326 can calculate the chunk's expiration time as the chunk's most recent creation time plus the chunk's longest expiration period. If this expiration time is already in the past relative to the current time, the expiration logic 326 can safely cast away the entire chunk without individual event scanning, as it is guaranteed that the chunk contains no events to keep. For example, if the expiration logic 326 runs every week and encounters a week-old chunk (based on its most recent time) full of only debug events with the three-day expiration period, the expiration logic does not need to read the chunk contents to know the chunk contains only expired log events, which is significantly more efficient.

FIG. 4 thus shows the source segment 452$s$ (where "s" represents source) to scan for expired/unexpired events, and a resultant segment 452$d$ (where "d" represents destination) after scanning; there can be different resultant segments based routing keys. One or more chunks can be eliminated as described above without reading the data, whereby the number of Tier-2 destination chunks 461 is often less than the number of Tier-2 source chunks 441. Further, when the source chunks' events are scanned and processed, because expired events are not copied, the sizes of the resultant (remaining) Tier-2 destination chunks 461 are often much smaller than the sizes of the Tier-2 source chunks 441. Additional details of an example event expiration process are described with reference to FIGS. 7-12.

As can be understood, the overall efficiency of the expiration technology described herein generally depends on the distribution of expiration periods. In case of log streams, if the vast majority of events normally have low logging levels with short expiration periods, and the expiration logic does not run too often, the expiration logic has relatively little work to do. Namely, in such a scenario the number of events to copy is expected to be small and the major part of chunks can be cast away without scanning of their content.

Figure 5:
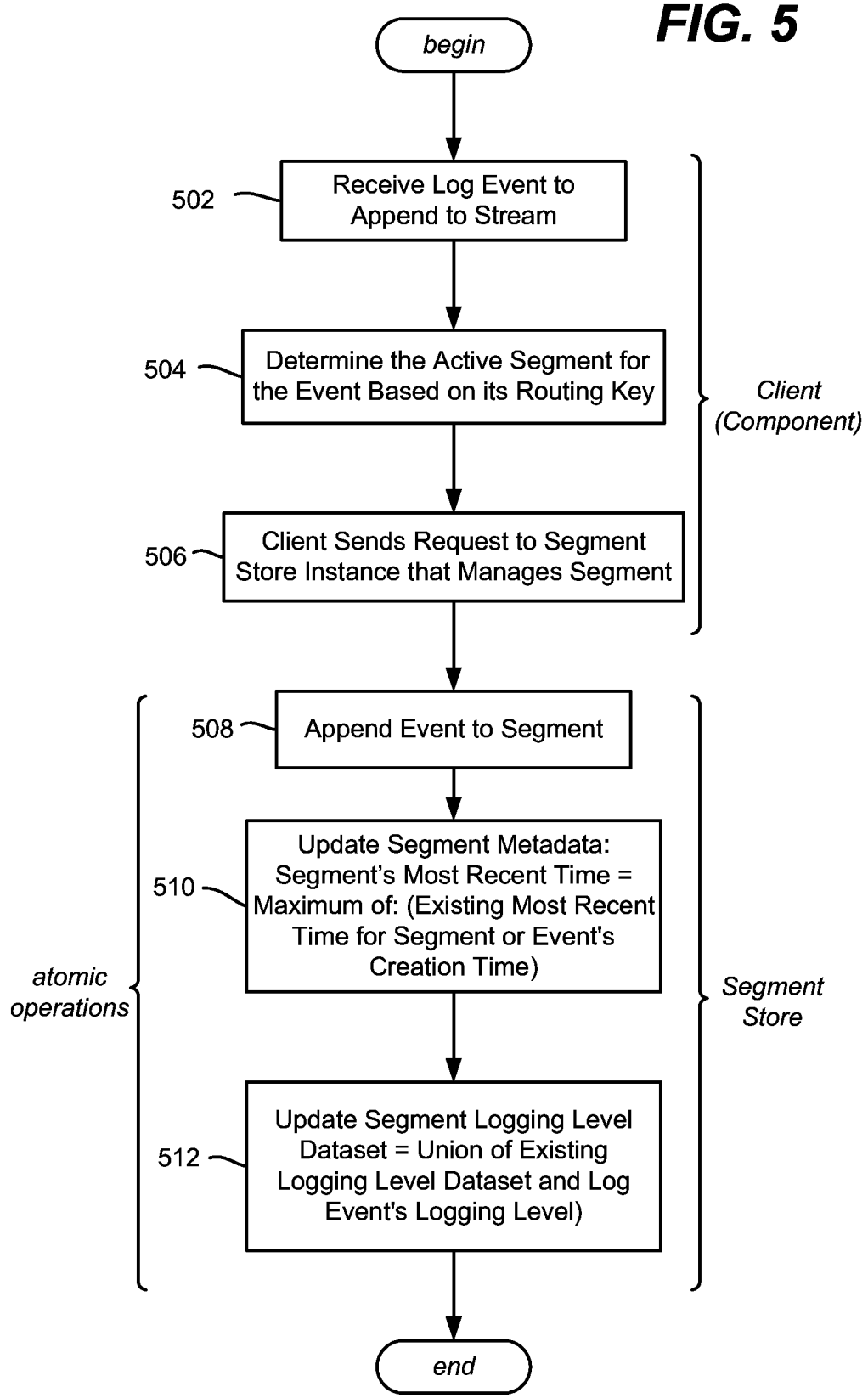
FIG. 5 is a flow diagram showing example operations related to appending an event to be subsequently processed via expiration logic, in accordance with various aspects and implementations of the subject disclosure.

FIG. 5 is a flow diagram of example operations representing how events (e.g., log events) are ingested into a data stream in accordance with the technology described herein. As represented by operation 502, a writer component (e.g., of the client component) receives a log event E with a routing key RK, creation time T and logging level L to append to a data stream. At operation 504, the writer component determines the active segment for the event based on its routing key. In one implementation, this is accomplished by having the writer query the controller for the segment identifier to which the routing key RK maps, whereby the controller responds with the segment identifier, e.g., Sg. As represented by operation 506, the client component writer identifies the segment store instance that owns (manages) the segment Sg and sends the event E to that instance.

As represented by operations 508, 510 and 512, which are atomic operations in one implementation, the segment store instance handles the event as follows. At operation 510, the segment store instance appends the event E to the segment Sg. At operations 510 and 512, the segment store also updates the segment's metadata most recent time data structure (S.MostRecentTime:=Max(S.MostRecentTime, E.CreationTime), operation 510) and updates the segment's logging level dataset by unioning the event's logging level with any logging level(s) already in the dataset, (S.LoggingLevels:=S.LoggingLevels∪{E.LogLevel}, operation 512).

As set forth above, older events of a data stream's segments are maintained in Tier-2 storage, and thus are moved from Tier-1 storage to Tier-2 storage (chunks), such as in accordance with a policy setting (e.g., size-based or age based). To take into consideration fine-grained event expiration as described herein, certain operations are performed to make fine-grained event expiration of Tier-2 storage events highly efficient.

Figure 6:
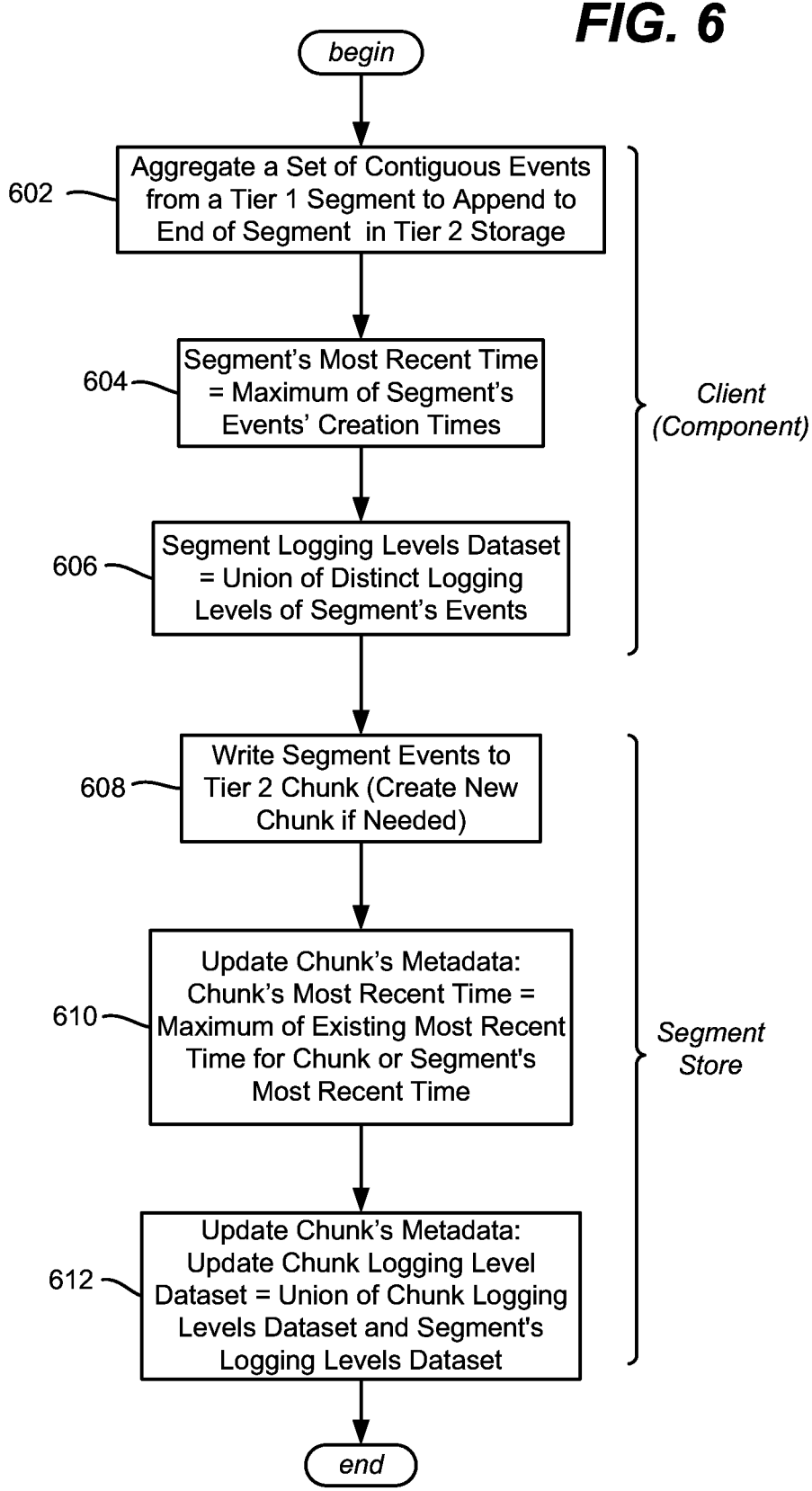
FIG. 6 is a flow diagram showing example operations related to moving f segment's events from Tier-1 storage to Tier-2 storage to be subsequently processed via expiration logic, in accordance with various aspects and implementations of the subject disclosure.
Figure 7:
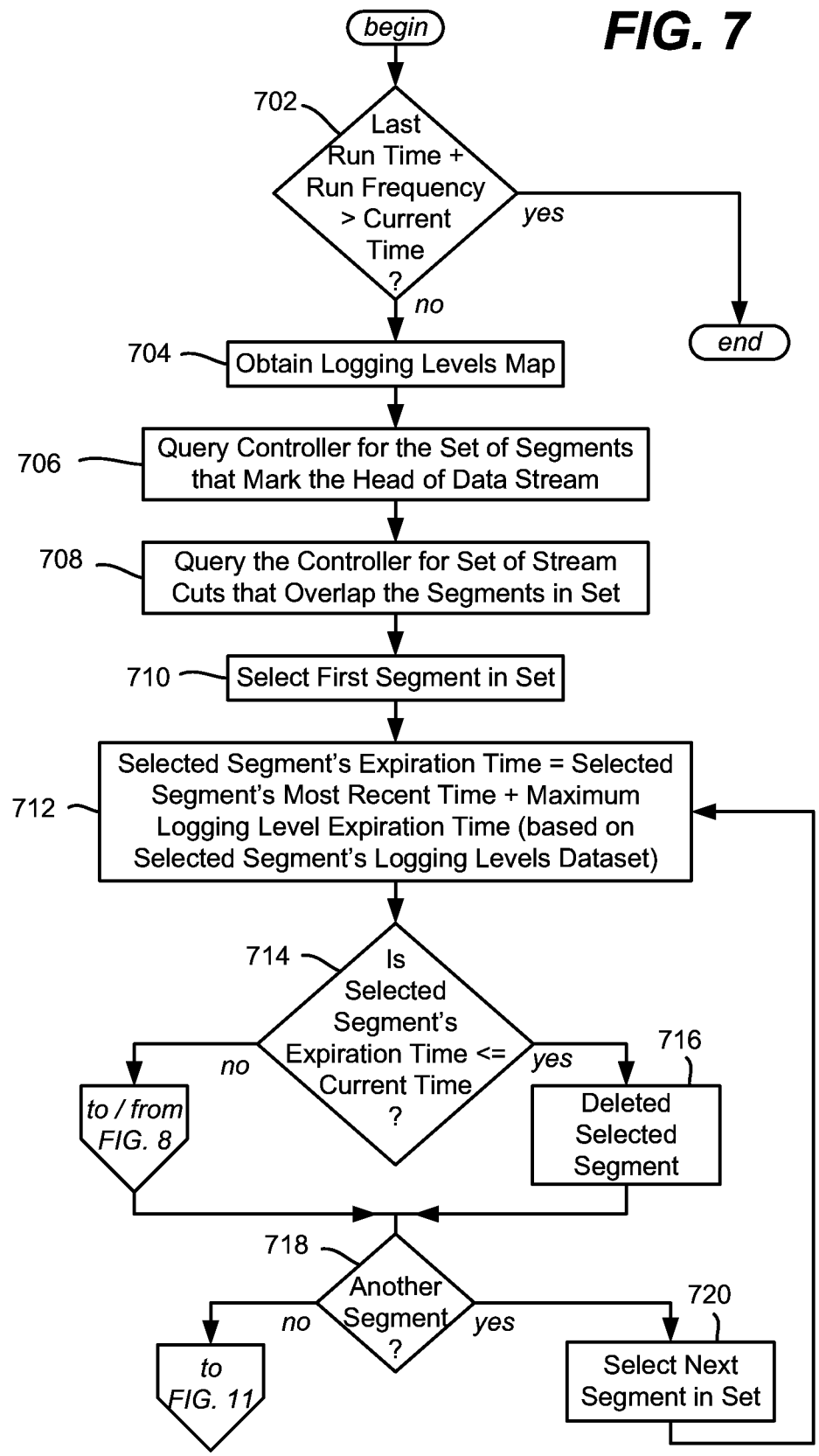
FIGS. 7-12 comprise a flow diagram showing example operations related to performing fine-grained event expiration, in accordance with various aspects and implementations of the subject disclosure.

FIG. 6 is a flow diagram of example operations representing how events (e.g., log events) are moved from Tier-1 storage to Tier-2 storage in a system that facilitates fine-grained data expiration as described herein. At operation 602, the segment store aggregates a set of contiguous events SE from a Tier-1 segment Sg to append at the end of the segment Sg in Tier-2 storage.

At operation 604, the segment store calculates the segment's most recent time as the maximum of the segment's events' creation times, e.g., SE.MostRecentTime:=Max (E.CreationTime) for the events E in the segment's event set SE. At operation 606, the segment store determines the segment logging levels dataset as the union of distinct logging levels of the segment's events, e.g., SE.LoggingLevels:=Distinct_Union(E.LogLevel) for the events E in in the segment event set SE.

When writing the segment event set SE to a data chunk C (operation 608, whether the chunk C already exists or is created as part of this update), the segment store also updates the chunk C's metadata at operations 610 and 612. Operations 608, 610 and 612 can be atomic operations. This metadata updating includes maintaining, via operation 610, the chunk's most recent time as the maximum of the existing most recent time for chunk or the segment's most recent time, e.g., C.MostRecentTime:=Max(C.MostRecentTime, SE.MostRecentTime). This also includes operation 612, which updates the chunk logging level dataset as the union of the chunk logging levels dataset and the segment's logging levels dataset, e.g., C.LoggingLevels:=C.LoggingLevels∪SE.LoggingLevels.

Turning to event expiration as described herein, the expiration logic is generally a service that may coexist with any existing streaming data storage system and/or be run on a processor node. The streaming data storage system needs to determine when the expiration logic needs to run (which can be referred to as the expiration logic run frequency, or alternatively the expiration logic run interval).

The run frequency can be manually defined. For example, as shown in FIG. 3, an administrator or the like can set a property (a data policy value S.RunFrequency) on the data stream metadata to indicate the frequency to run the expiration logic on that stream. An alternative is to automatically calculate the expiration logic run frequency based on the logging levels defined on the stream; for example, a multiple of the lowest expiration time can be used, or some other custom function can be defined. This alternative can be selected in data stream policy, for example, as well as which function to use. Regardless of how the run frequency is determined, the system (e.g., the expiration logic) stores a last run field 334 (FIG. 3), e.g., S.LastRun, in the data stream metadata that indicates when the expiration logic has last performed a run operation.

FIGS. 7-12 comprise a flow diagram of example operations related to running the expiration logic for a data stream S. Operation 702 evaluates whether it is time to run the expiration logic on the stream, e.g., if the S.LastRun time metadata plus the S.RunFrequency value in policy/metadata is greater than the current time, abort (do not do anything). Otherwise, the expiration logic runs, using the data stream's logging levels (S.LoggingLevels) as defined for the stream.

Operation 704 represents the expiration logic obtaining the logging levels-to-expiration times map, e.g., by querying the controller. Operation 706 represents the expiration logic querying the controller for the set of segments (SgE) that mark the head of the data stream S (that is, the oldest segments). Operation 708 queries the controller for the set of stream cuts SC that overlap the segments in segment set SgE.

For each segment Si in the segment set SgE, (selected via operations 710, 718 and 720), at operation 712 the expiration logic determines the selected segment's expiration time as the selected segment's most recent time plus the maximum logging level expiration time (based on the selected segment's logging levels dataset), that is, calculate Si.ExpirationTime:=Si.MostRecentTime+Max(Si.LoggingLevels.ExpirationTime). Note that the process does not store the logging level expiration time in each segment, as the logging level expiration time can be changed at will by the user, whereby each execution fetches the latest values for those log levels.

Operation 714 evaluates whether the selected segment's expiration time is less than or equal to the current time, and if so, operation 716 deletes the segment without further processing, as the entire selected Tier-2 segment Si is expired. That is, if Si.ExpirationTime<=CurrentTime, delete the selected segment Si and move to operations 718 and 720 to select a next segment until no segments remain to be processed.

Figure 8:
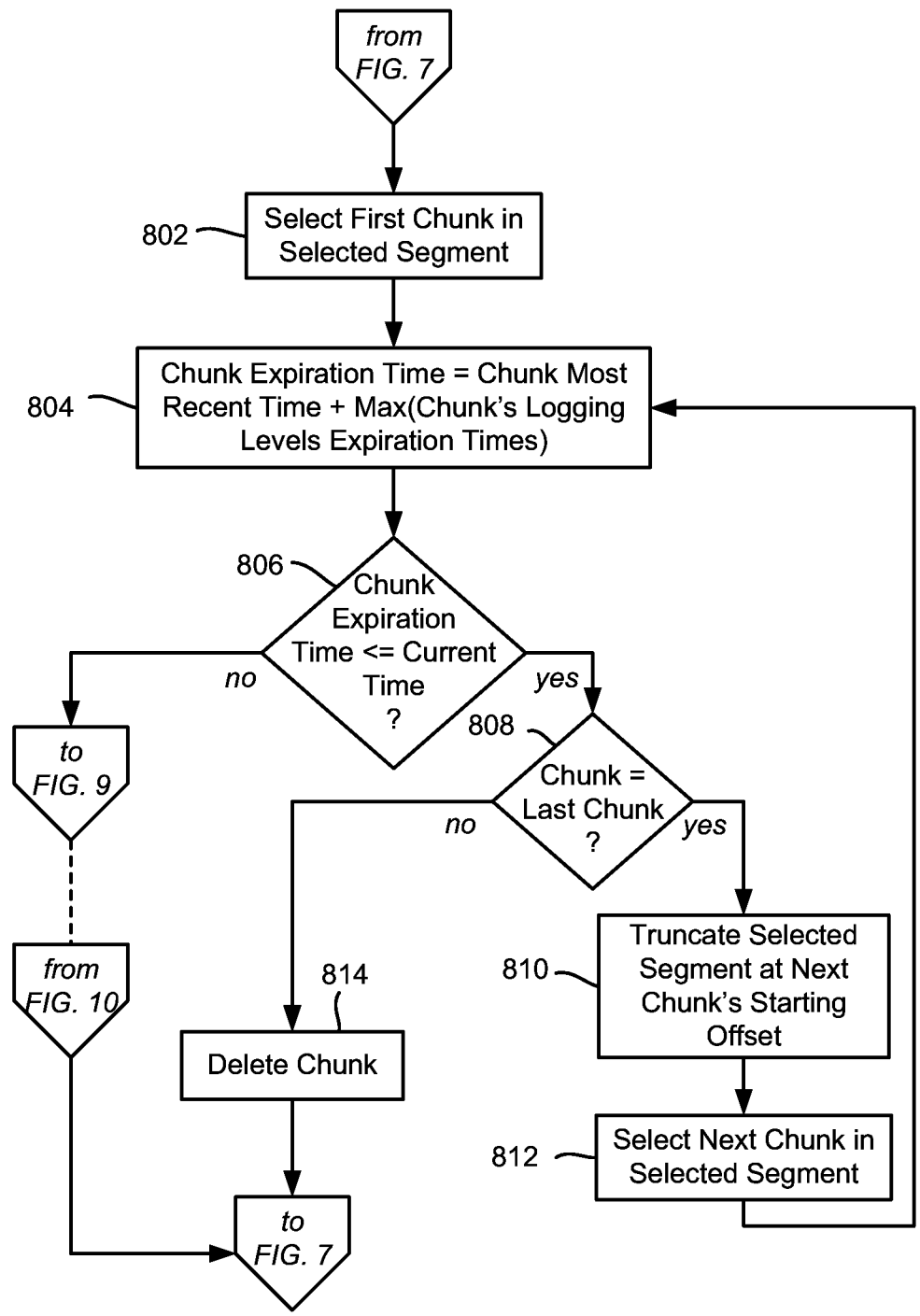

If the selected segment Si is not expired the process continues to FIG. 8, where each chunk Ci in the selected segment's set of chunks Si.Chunks, is selected and processed in order (from first to last) via operations 802, 808 and 812. Operation 802 selects the first chunk, and operation 804 sets the chunk expiration time to be the chunk most recent time plus the maximum of the chunk's logging levels expiration times), that is, Calculate Ci.ExpirationTime:=Ci.MostRecentTime+Max(Ci.LoggingLevels.ExpirationTime). Based on this value, if the entire chunk is expired, Ci.ExpirationTime<=CurrentTime, and if the chunk is not the last chunk of the segment (operation 810), truncates the segment Si to not include the chunk, that is, the segment is truncated at offset Ci+1.StartOffset; this means "delete the chunk Ci" and set the selected segment's (Si's) beginning to be the offset immediately after the deleted chunk. Operation 812 selects the next chunk in the segment for similar processing by returning to operation 804. Note that if instead at operation 808 the chunk is the last chunk, the chunk is deleted via operation 814 and the process returns to select the next segment.

Figure 9:
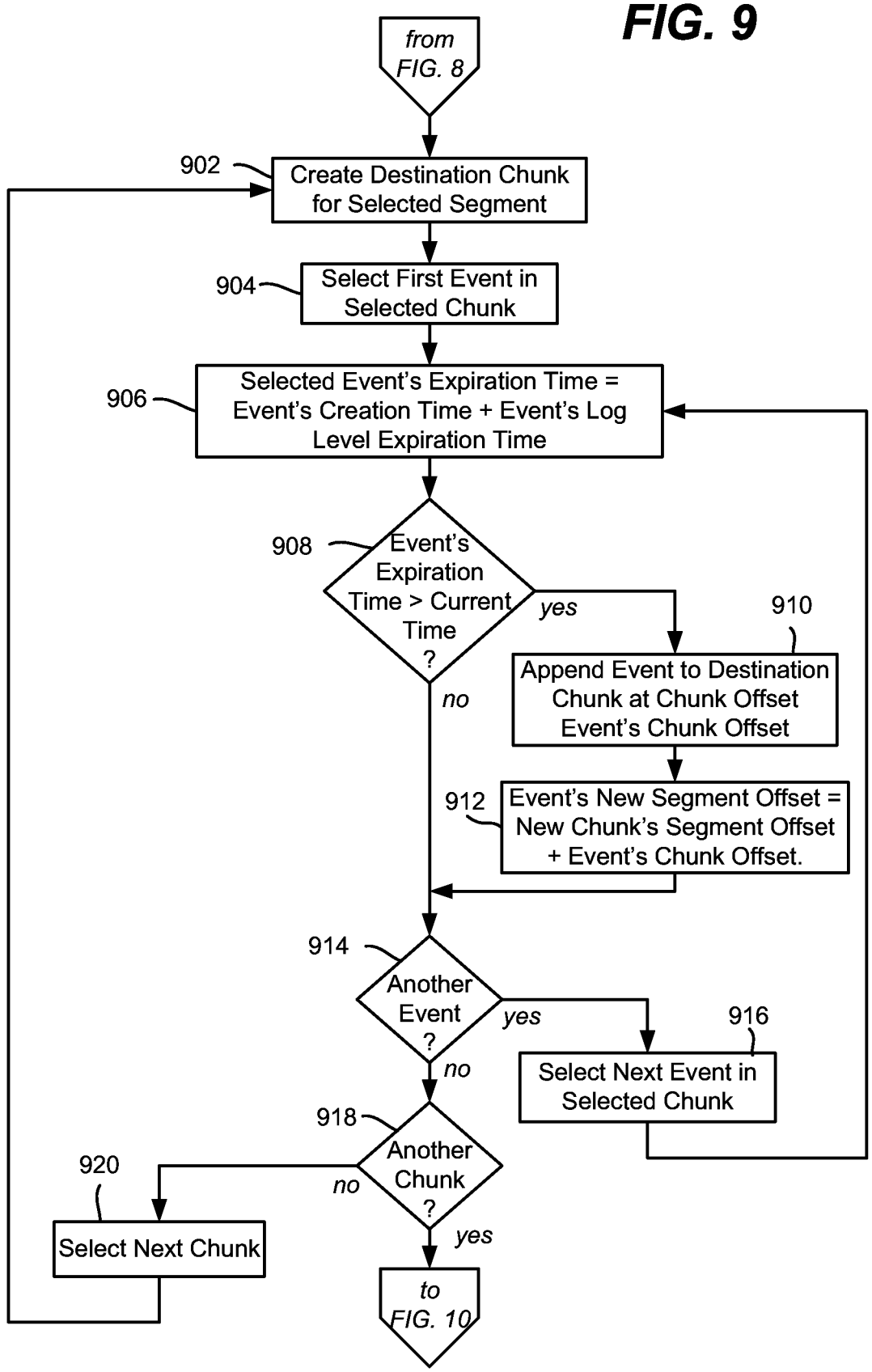

Returning to operation 806, it the chunk is not expired, that is, if Ci.ExpirationTime>CurrentTime, the events in the chunk are read and evaluated to determine whether each event expired or unexpired. This part of the process is shown in FIG. 9, where the actual chunks are read and expired events therein are removed.

To run the expiration logic for the remaining chunks that are part of the currently selected segment Si, which is part of the data stream S, operation 902 creates a new destination chunk corresponding to the currently selected chunk, that is, the currently selected chunk is the "source" chunk (note that the current chunk is already selected, e.g., via operation 812 of FIG. 8). Via operations 904, 914 and 916, for each event E in the source chunk Cj (with E.OldSegmentOffset being the event E's current segment offset), operation 906 sets the selected event's expiration time to equal the event's creation time plus event's log level expiration time (known via the logging level map), that is, calculate E.ExpirationTime: =E.CreationTime+E.LogLevel.ExpirationTime.

Operation 908 evaluates whether the calculated expiration time of the selected event is greater the current time, and if so, operation 910 appends (copies) the selected event to the counterpart destination chunk, (more formally, if E.ExpirationTime>CurrentTime, append E to Cj' at chunk offset E.ChunkOffset). Operation 912 adjusts the destination chunk's offset accordingly, E.NewSegmentOffset=Cj'.SegmentOffset+E.ChunkOffset.

Operations 914 and 916 repeat this part of the process for the next event until none remain in the selected chunk. Operations 918 and 920 repeat this part of the process for the next chunk and so on, until no chunks remain to be processed, (or a stopping point is otherwise reached). Note that as set forth above, if it is detected that based on the minimal expiration time no events in the selected chunk can be expired, this can be considered the last chunk for processing with respect to expiration as described herein. Any such chunk and later chunks can be automatically considered "destination" chunks without actually creating such destination chunks or having events copied thereto.

Figure 10:
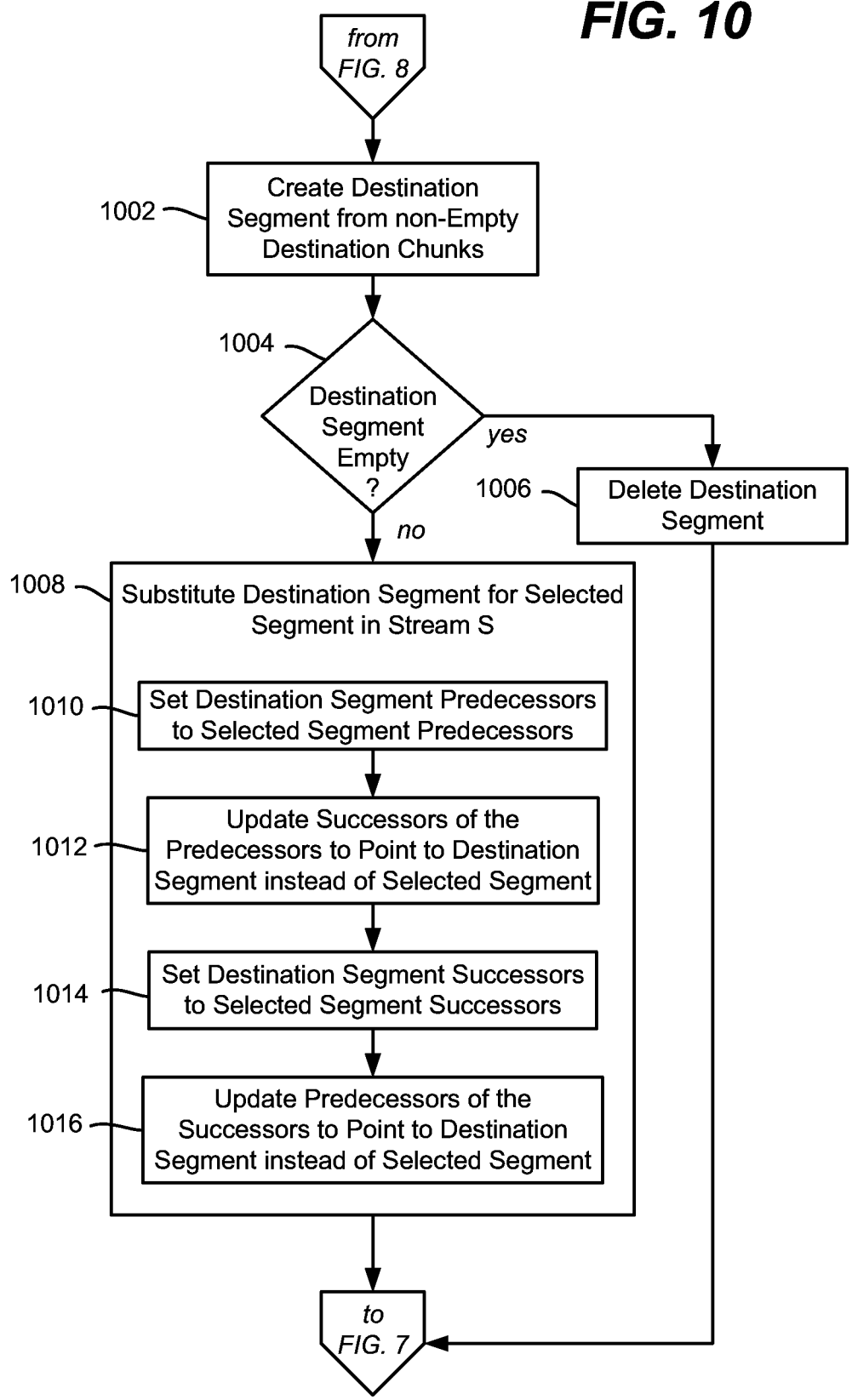

When the chunks' events have finished being evaluated, the expiration process continues to FIG. 10, operation 1002 which creates a destination Tier-2 segment part $S_i'$ made of any chunks (that are not empty) that were generated via FIG. 9. If $S_i'$ is empty as evaluated at operation 1004, then $S_i$ can be deleted (operation 1006).

If the segment set Si is not empty, operation 1008 substitutes the destination Tier-2 segment part $S_i'$ for the currently selected segment $S_i$ in data stream S. To this end, operation 1010 sets the predecessor segments of the new destination segment $S_i'$ to the selected segment's predecessor segments, that is, $S_i'$.Predecessors:=$S_i$.Predecessors, and operation 1012 updates the successors of the predecessors to point to the new destination segment $S_i'$ instead of the selected segment $S_i$. Similarly, operation 1014 sets the successors segments of the new destination segment $S_i'$ to the selected segment's successors segments, that is, $S_i'$.Successors:=$S_i$.Successors, and operation 1016 updates the predecessors of the successors to point to the new destination segment $S_i'$ instead of the selected segment $S_i$.

Figure 11:
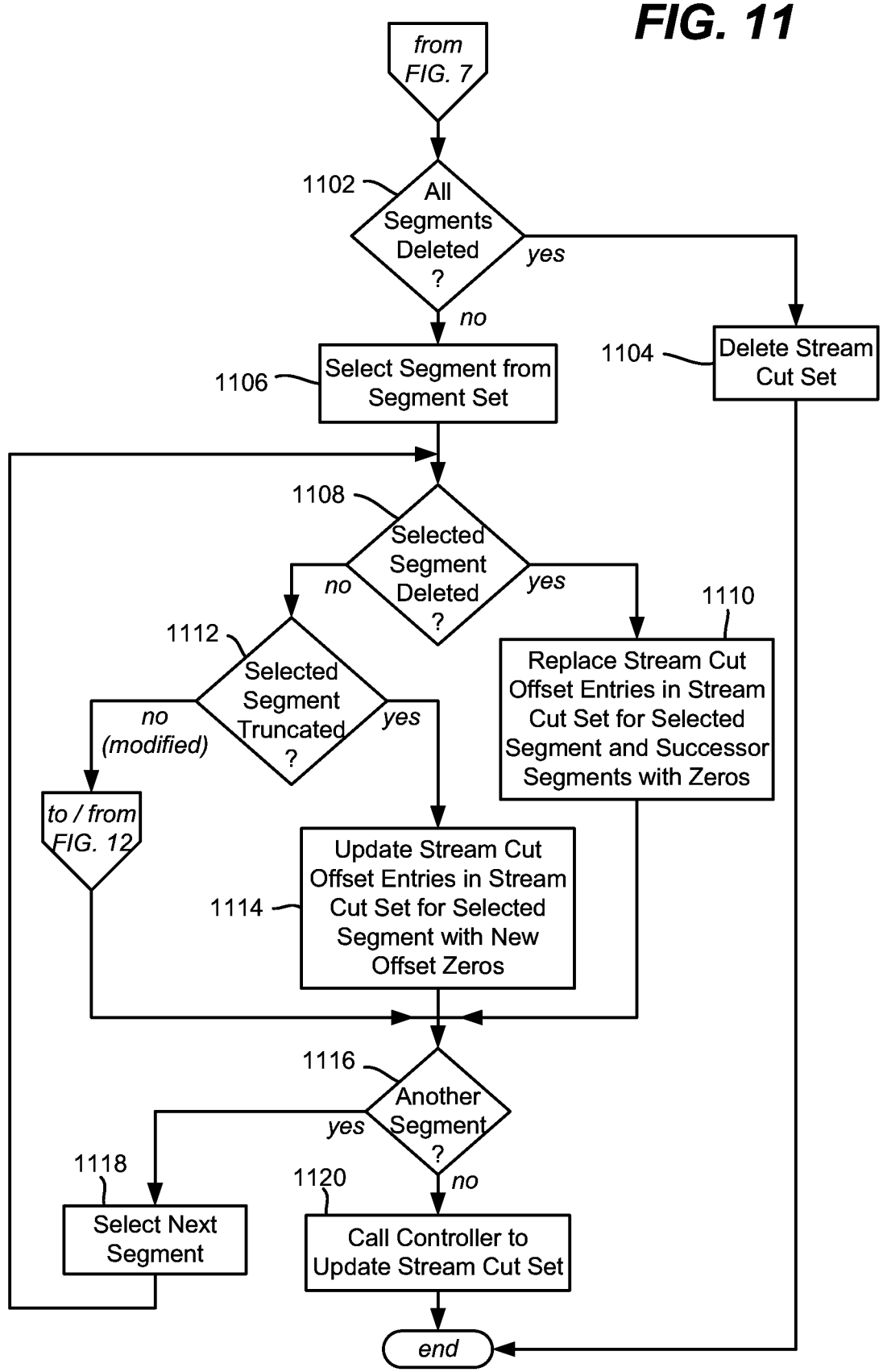
Figure 12:
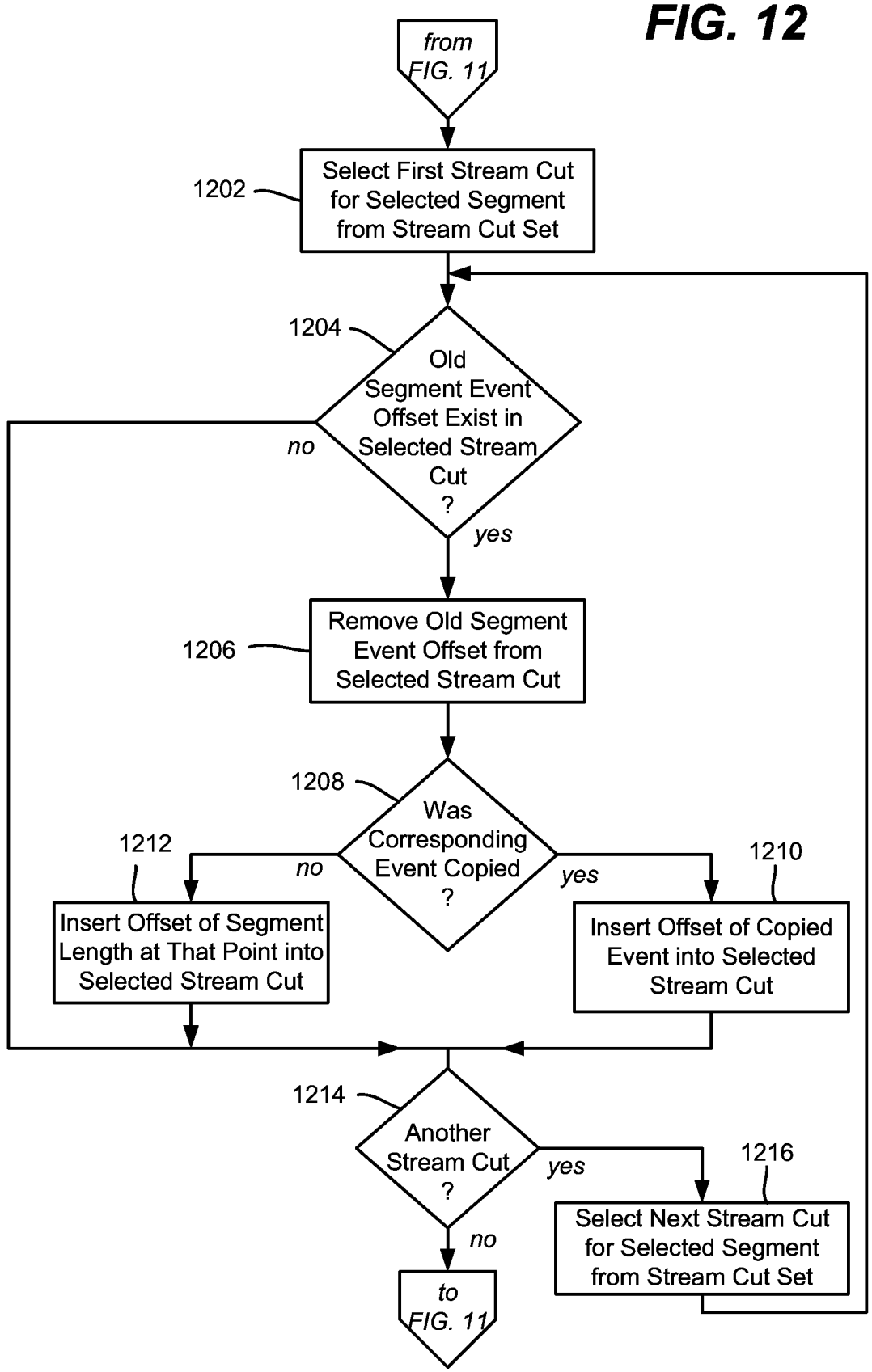

As set forth above, the expiration process described herein needs to consider stream cuts, as generally represented in FIGS. 11 and 12. In particular, if at operation 1102 of FIG. 11 the segments in the segment set SgE are deleted, then the system needs to delete the stream cut set SC associated with the segment set, (obtained at operation 706) because the stream cuts point to invalid offsets. This can be done at operation 1104 by one or more calls to the controller to invoke and delete the stream cuts in the stream cut set SC.

In contrast, if at least one segment in the segment set SgE remains (or is replaced), then the stream cuts are considered for each Segment $S_i$ in the segment set SgE as selected via operations 1106, 1116 and 1118.

If as evaluated at operation 1108 the selected segment $S_i$ is deleted, then operation 1110 replaces the stream cut offset entries in stream cut set for selected segment and successor segments with zeros, that is, replace $\{S_i, S_i\text{.Offset}\}$ with $\{S_i\text{.Successors}, 0\}$ for the Stream Cuts in the stream cut set SC. Note there may be more than one successor segment (if the segment $S_i$ was split).

If instead as evaluated at operation 1112 the selected segment $S_i$ is truncated, then operation 1114 updates the stream cut offset entries in the stream cut set for the selected segment with the segment's new offset value, that is, update $\{S_i, S_i\text{.OldOffset}\}$ with $\{S_i, S_i\text{.NewStartOffset}\}$ for all Stream Cuts in SC. Note that $S_i$.NewStartOffset is known as previously described herein.

Otherwise the selected segment was modified into a new destination segment as described herein, and the process branches to FIG. 12. Note that a modified segment does not necessarily have an event boundary that directly corresponds to the event boundary in the stream cut set, because modified segments only contain non-expired events. Thus, the expiration logic updates the stream cuts to point to valid event boundaries that are as close as possible to where they were originally pointing.

It should be noted that at least some of the operations of FIG. 12 can be performed while creating the new destination segment Si' as described with reference to FIG. 10. For optimization purposes, the expiration logic may choose to pre-fetch the "interesting" offsets from the stream cuts SCm (the stream cuts for the selected segment Si) and then update the stream cuts SCm after the surviving events are copied over.

At operation 1202, the first stream cut in the stream cut set SC is selected as the selected stream cut SCm. Operation 1204 evaluates whether the old offset segment exists in the selected stream cut, that is, whether {Si, E.OldSegmentOffset} exists in SCm. If not, the next stream cut is selected for similar processing, until none remain, via operations 1214 and 1216.

If instead at operation 1204 the old offset segment event exists in the selected stream cut, operation 1206 removes the segment's offset from the selected stream cut, that is, remove {Si, E.OldSegmentOffset} from SCm. Then, the offset is replaced based on whether the corresponding event was copied (operation 1208), that is, if copied operation 1210 inserts the corresponding copied event's offset into the selected stream cut for that selected segment, that is, Insert {Si', E.NewSegmentOffset} into SCm. If not copied, then the segment length at the point of copied is instead inserted into selected stream cut for that selected segment via operation 1212, that is, Insert {Si', Si'.Length} into SCm. As can be seen, if not copied, the stream cut is updated to point to a valid event boundary that is as close as possible to where the stream cut originally pointed.

Returning to FIG. 11, after each segment has been processed in this way via operations 1116 and 1118, the actual stream cuts corresponding to the (modified) stream cut set can be modified. To this end, operation 1120 calls the controller to update the stream cuts SC with the changes that were performed via the operations of FIGS. 11 and/or 12.

With respect to deletion of a segment, it is feasible to delete the currently selected segment Si once it has been fully processed as described herein. Note however that as an option, deletion can be deferred, if, for example, there are active readers that are still reading from the selected segment Si. To not fail such readers, the system can delay deleting the selected segment until such readers are done reading (note that no new readers will read from the selected segment Si because Si is no longer part of the data stream S; those readers can read from a replacement segment Si' and any subsequent segments). A timeout can be configured to delete Si if its reader is idle for a too long time.

Figure 13:
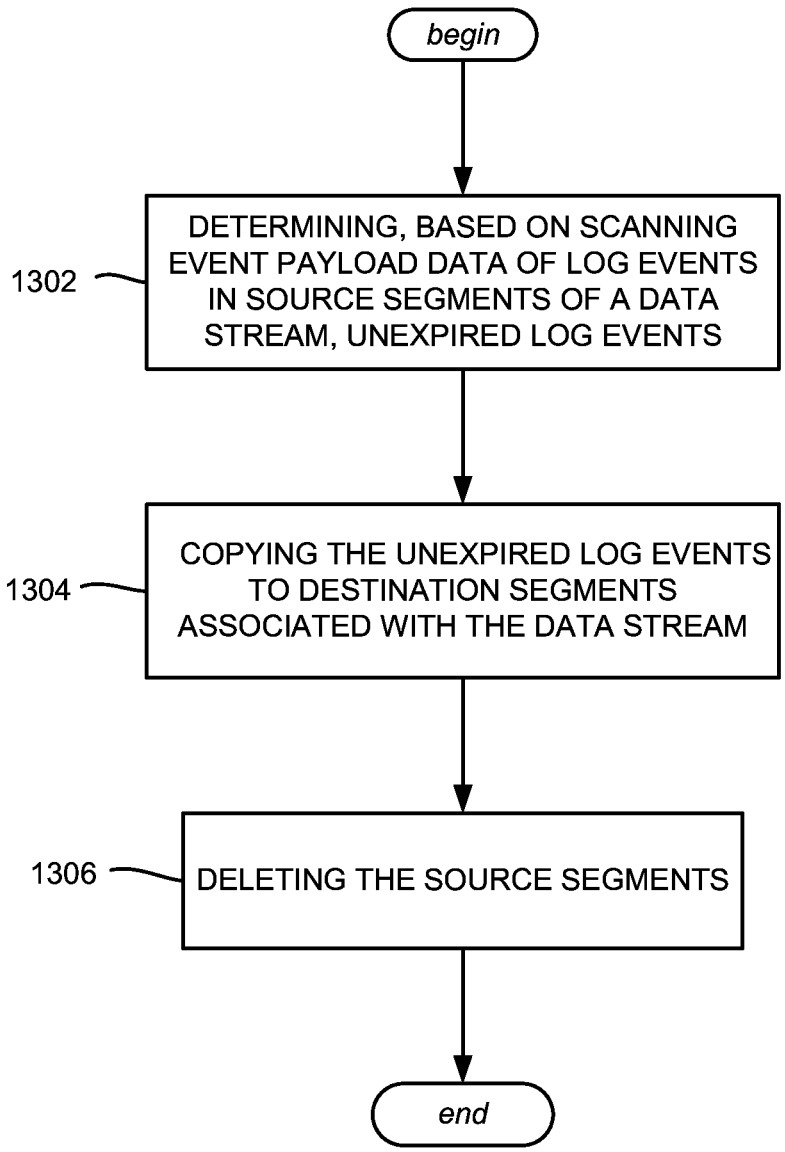
FIG. 13 is an example flow diagram showing example operations related to determining unexpired events and copying the unexpired events to a destination segment, in accordance with various aspects and implementations of the subject disclosure.

One or more aspects can be embodied in a system, such as represented in FIG. 13, and for example can comprise a memory that stores computer executable components and/or operations, and a processor that executes computer executable components and/or operations stored in the memory.

Example operations can comprise operation 1302, which represents determining, based on scanning event payload data of log events in source segments of a data stream, unexpired log events. Operation 1304 represents copying the unexpired log events to destination segments associated with the data stream. Operation 1306 represents deleting the source segments.

Determining the unexpired stream events can comprise, for a selected log event, determining a log event expiration period based on a log event creation time and a logging level of the selected log event, and, in response to a current time being within the expiration period, determining that the selected log event is an unexpired event.

Determining the unexpired stream events can comprise, for a selected log event, determining a log event expiration period based on a log event creation time and the event payload data of the selected log event, and, in response to a current time being within the expiration period, determining that the selected log event is an unexpired event.

Further operations can comprise updating stream cut data associated with the data stream.

Copying the unexpired log events to the destination segments associated with the data stream can comprise, for a selected log event, determining a selected destination segment based on a routing key extracted from the event payload data of the selected log event. Determining the selected destination segment based on the routing key can comprise generating the routing key based on a cluster node field and a component field in the event payload data of the selected log event.

Part of the source segments can be maintained in a data chunk, and further operations can comprise determining a data chunk expiration time, evaluating the data chunk expiration time relative to a current time, and in response to determining that the data chunk expiration time is prior to the current time, determining that the data chunk contains no unexpired log events, and deleting the chunk as part of deleting the source segments. Determining the data chunk expiration time can comprise obtaining system metadata corresponding to a most recent creation time among log events in the data chunk, and determining a longest expiration period among the log events in the data chunk. Determining the longest expiration period among the log events in the data chunk can comprise maintaining a dataset comprising distinct logging levels of the log events in the chunk.

Further operations can comprise halting the scanning upon reaching a log event that with a log event creation time that is more recent than a predetermined minimal data stream expiration period.

Further operations can comprise waiting, based on a reader of one or more of the source segments, before the deleting the source segments.

Figure 14:
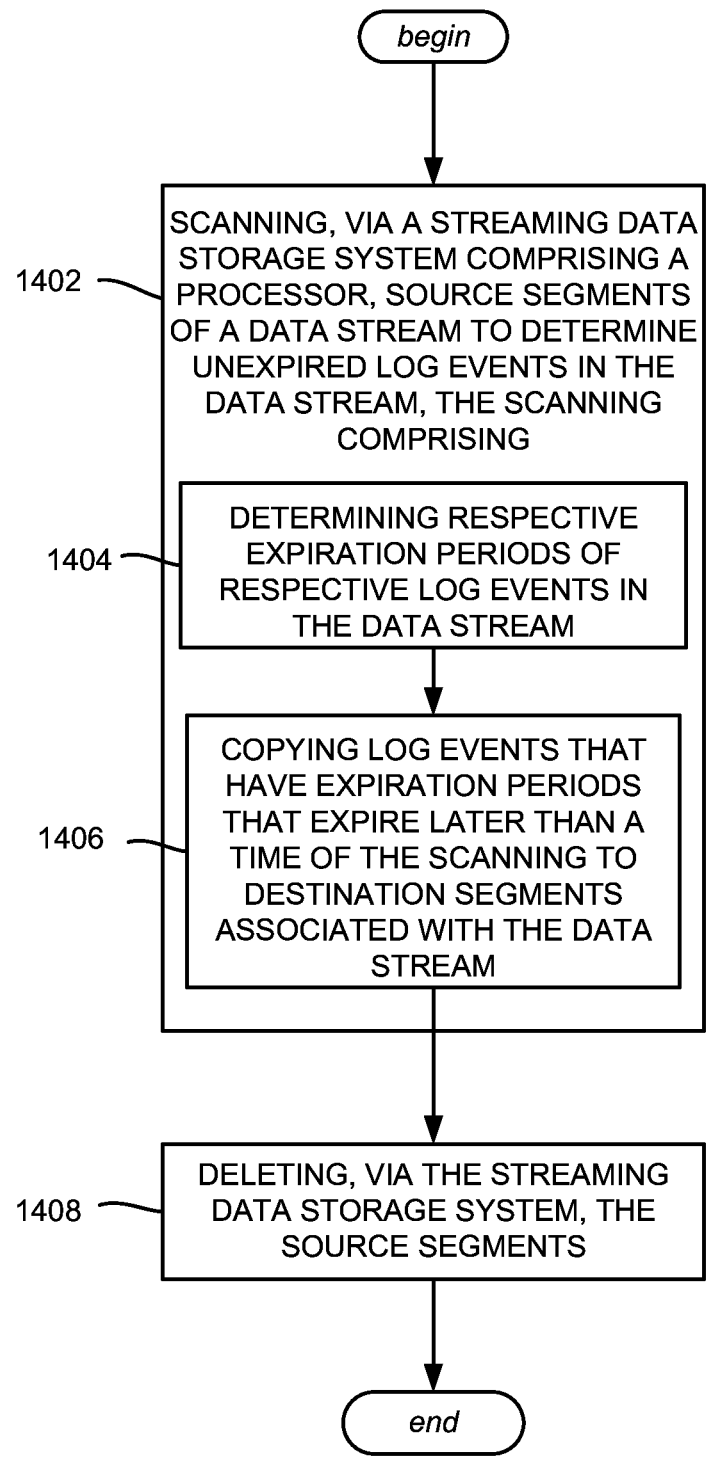
FIG. 14 is an example flow diagram showing example operations related to scanning source segments of a data stream to determine unexpired events for copying to a destination segments, in accordance with various aspects and implementations of the subject disclosure.

One or more example aspects, such as corresponding to example operations of a method, are represented in FIG. 14. Operation 1402 represents scanning, via a streaming data storage system comprising a processor, source segments of a data stream to determine unexpired log events in the data stream. The scanning can comprise determining respective expiration periods of respective log events in the data stream (operation 1404), and copying log events that have expiration periods that expire later than a time of the scanning to destination segments associated with the data stream (operation 1406). Operation 1408 represents deleting, via the streaming data storage system, the source segments.

Determining the respective expiration periods of the respective log events can comprise obtaining respective creation times and respective logging levels from respective log event data of the respective log events, and wherein the respective logging levels map to expiration data associated with the data stream.

Operations can comprise determining, for a selected log event, a destination segment based on at least one of: a cluster node field in data of the selected log event, or a component field in the data of the selected log event data.

Part of the source segments can be maintained as log events in a data chunk, and further operations can comprise determining a data chunk expiration time, evaluating the data chunk expiration time relative to a current time, and, in response to determining that the data chunk expiration time is prior to the current time, determining that the data chunk contains no unexpired log events, and deleting the chunk as part of deleting the source segments.

Determining the data chunk expiration time can comprise obtaining system metadata corresponding to a most recent creation time of log events in the chunk, and determining a longest expiration period of the log events in the chunk based on evaluating a dataset comprising distinct logging levels of the log events in the chunk, in which respective distinct logging levels map to respective expiration periods associated with the data stream.

Figure 15:
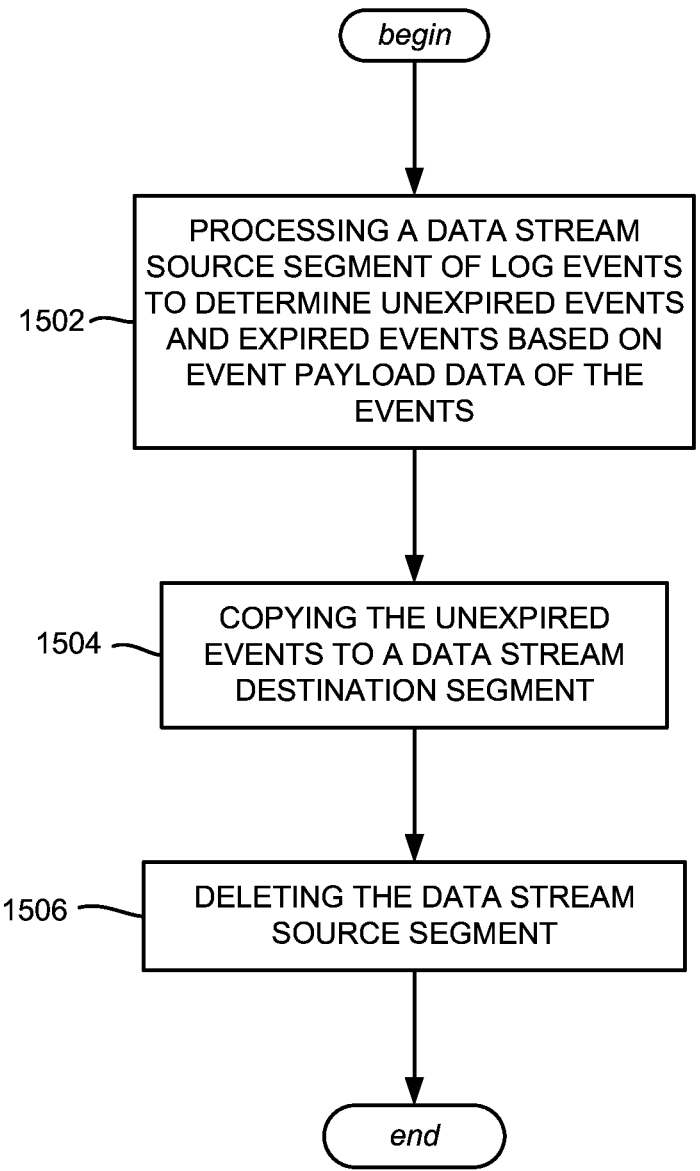
FIG. 15 is a flow diagram showing example operations related to determining unexpired events based on information in the events' payloads, in accordance with various aspects and implementations of the subject disclosure.

FIG. 15 summarizes various example operations, e.g., corresponding to a machine-readable storage medium, comprising executable instructions that, when executed by a processor of a streaming data storage system, facilitate performance of operations. Operation 1502 represents processing a data stream source segment of events to determine unexpired events and expired events based on event payload data of the events. Operation 1504 represents copying the unexpired events to a data stream destination segment. Operation 1506 represents deleting the data stream source segment.

Processing the data stream source segment can comprise, for each log event, extracting an event creation time based on an event logging time in the event payload data, and extracting, from the event payload data, a logging level that maps to an expiration period associated with the data stream source segment.

Part of the data stream source segments can be maintained as log events in a data chunk, and further operations can comprise determining a data chunk expiration time based on a most recent creation time among the log events in the chunk and distinct logging levels of the log events in the chunk, evaluating the data chunk expiration time relative to a current time, and, in response to determining that the data chunk expiration time is prior to the current time, determining that the data chunk contains no unexpired log events, and deleting the chunk as part of deleting the data stream source segment.

Further operations can comprise, selecting the data stream destination segment based on the log event payload data.

As can be seen, described herein is a technology that facilitates fine-grained data expiration. The technology is practical, can be relatively lightweight and needs relatively little additional metadata. In some implementations and scenarios, the technology can operate without any additional per-event metadata.

Figure 16:
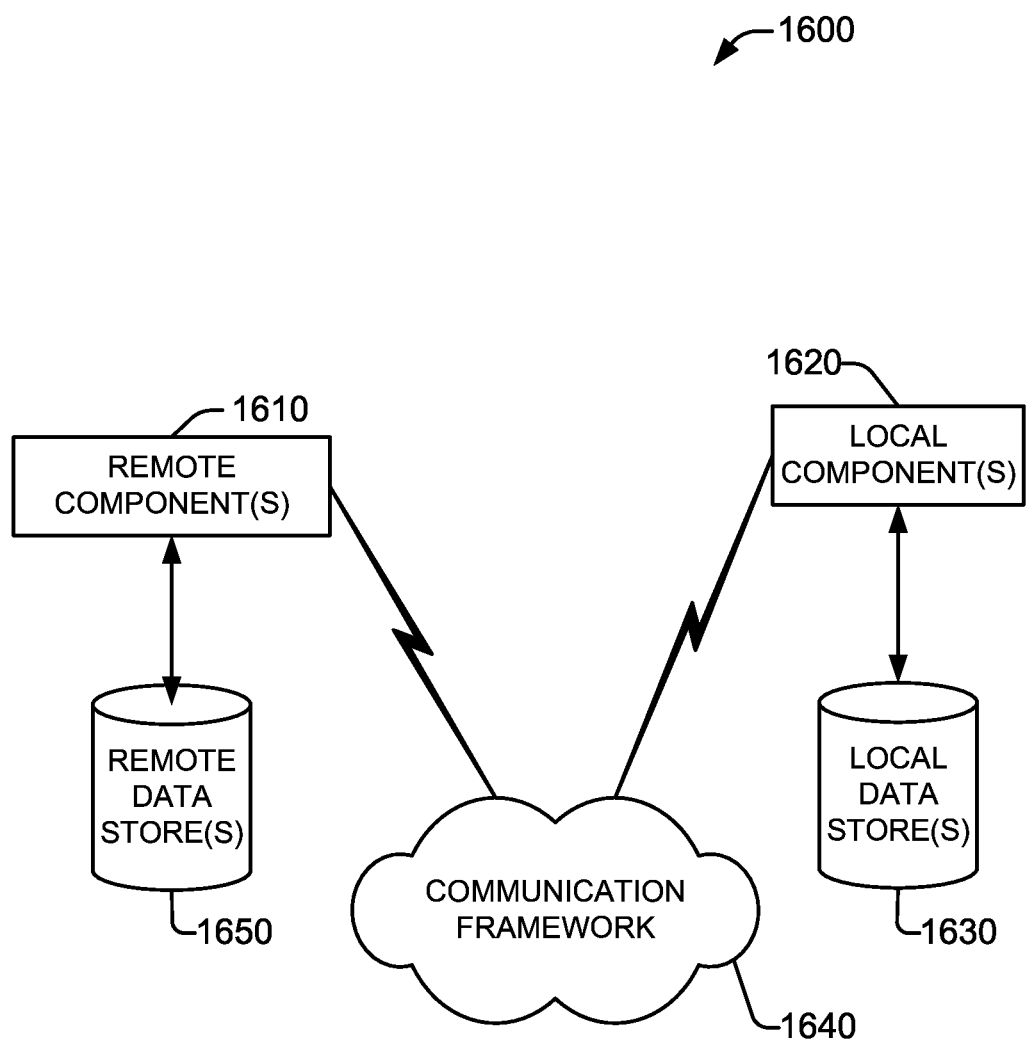
FIG. 16 is a block diagram representing an example computing environment into which aspects of the subject matter described herein may be incorporated.

FIG. 16 is a schematic block diagram of a system 1600 with which the disclosed subject matter can interact. The system 1600 comprises one or more remote component(s) 1610. The remote component(s) 1610 can be hardware and/or software (e.g., threads, processes, computing devices). In some embodiments, remote component(s) 1610 can be a distributed computer system, connected to a local automatic scaling component and/or programs that use the resources of a distributed computer system, via communication framework 1640. Communication framework 1640 can comprise wired network devices, wireless network devices, mobile devices, wearable devices, radio access network devices, gateway devices, femtocell devices, servers, etc.

The system 1600 also comprises one or more local component(s) 1620. The local component(s) 1620 can be hardware and/or software (e.g., threads, processes, computing devices). In some embodiments, local component(s) 1620 can comprise an automatic scaling component and/or programs that communicate/use the remote resources 1610 and 1620, etc., connected to a remotely located distributed computing system via communication framework 1640.

One possible communication between a remote component(s) 1610 and a local component(s) 1620 can be in the form of a data packet adapted to be transmitted between two or more computer processes. Another possible communication between a remote component(s) 1610 and a local component(s) 1620 can be in the form of circuit-switched data adapted to be transmitted between two or more computer processes in radio time slots. The system 1600 comprises a communication framework 1640 that can be employed to facilitate communications between the remote component(s) 1610 and the local component(s) 1620, and can comprise an air interface, e.g., Uu interface of a UMTS network, via a long-term evolution (LTE) network, etc. Remote component(s) 1610 can be operably connected to one or more remote data store(s) 1650, such as a hard drive, solid state drive, SIM card, device memory, etc., that can be employed to store information on the remote component(s) 1610 side of communication framework 1640. Similarly, local component(s) 1620 can be operably connected to one or more local data store(s) 1630, that can be employed to store information on the local component(s) 1620 side of communication framework 1640.

Figure 17:
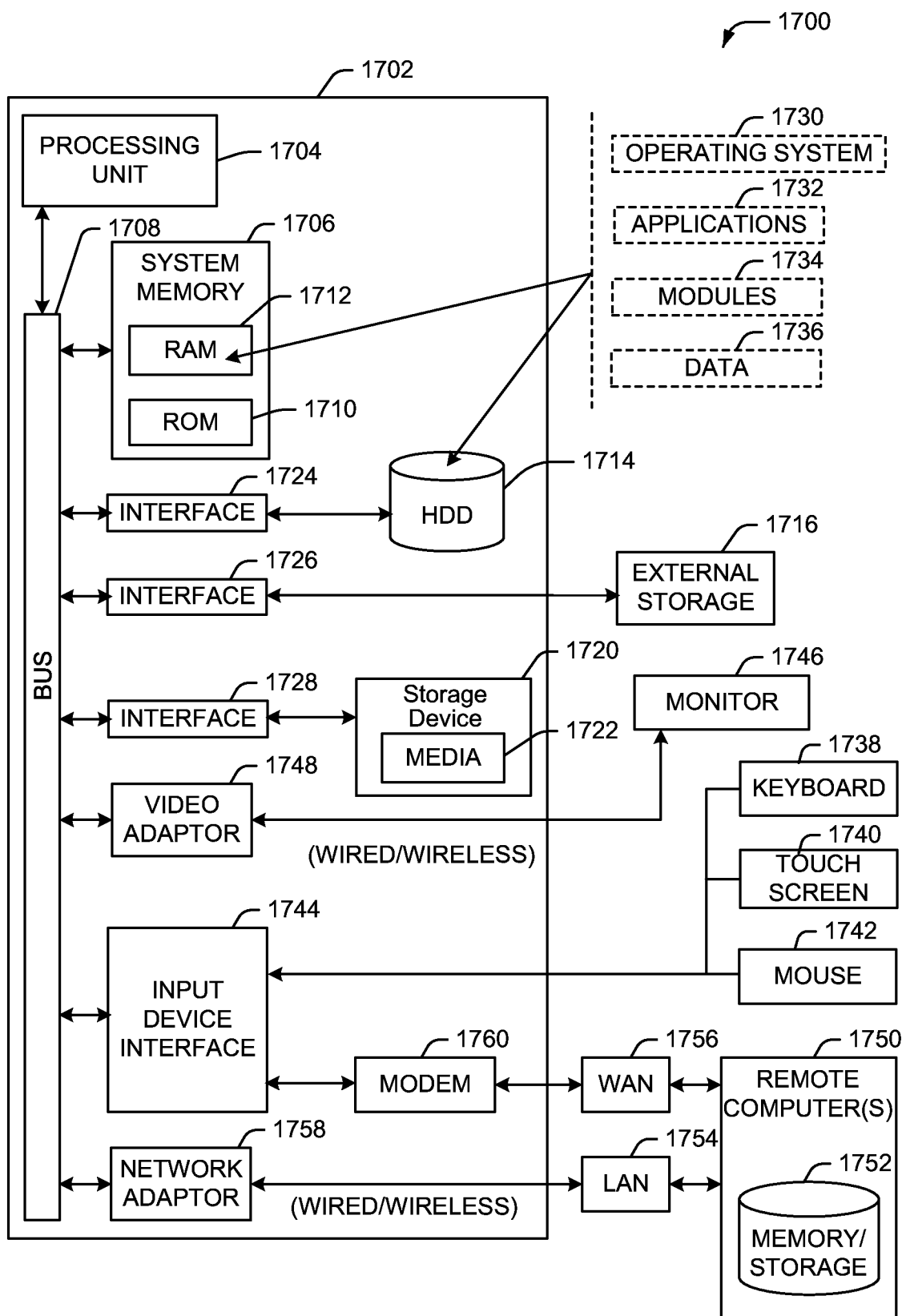
FIG. 17 depicts an example schematic block diagram of a computing environment with which the disclosed subject matter can interact/be implemented at least in part, in accordance with various aspects and implementations of the subject disclosure.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), and can include one or more external storage devices 1716 (e.g., a magnetic floppy disk drive (FDD) 1716, a memory stick or flash drive reader, a memory card reader, etc.). While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714.

Other internal or external storage can include at least one other storage device 1720 with storage media 1722 (e.g., a solid state storage device, a nonvolatile memory device, and/or an optical disk drive that can read or write from removable media such as a CD-ROM disc, a DVD, a BD, etc.). The external storage devices 1716 can be facilitated by a network virtual machine. The HDD 1714, external storage device(s) 1716 and storage device (e.g., drive) 1720 can be connected to the system bus 1708 by an HDD interface 1724, an external storage interface 1726 and a drive interface 1728, respectively.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enabled with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1794 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the LAN 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/ storage device 1752. It will be appreciated that the network connections shown are examples, and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   determining, based on scanning event payload data of log events in source segments of a data stream, unexpired log events of the log events, wherein respective log events of the log events comprise respective creation times and respective log event types, wherein the respective log events are associated with respective expiration periods that identify when the respective log events expire, wherein a first expiration period of the respective expiration periods differs from a second expiration period of the respective expiration periods, and wherein the determining the unexpired log events of the log events comprises determining the unexpired log events based on the respective creation times, the respective expiration periods, and a current time corresponding to the determining;
   halting the scanning in response to reaching a log event of the log events that comprises a creation time of the respective creation times that is more recent than an expiration time specified by a minimal data stream expiration period;
   copying the unexpired log events to destination segments associated with the data stream; and
   deleting the source segments, wherein a first source segment of the source segments comprises an expired log event of the log events, and wherein copying the expired log event is omitted prior to deleting the source segments.

2. The system of claim 1, wherein the determining the unexpired log events comprises, for a selected log event, determining a log event expiration period based on a log event creation time and a logging level of the selected log event, and, in response to the current time being within the log event expiration period, determining that the selected log event is an unexpired event.

3. The system of claim 1, wherein the determining the unexpired log events comprises, for a selected log event, determining a log event expiration period based on a log event creation time and payload data of the event payload data corresponding to the selected log event, and, in response to the current time being within the log event expiration period, determining that the selected log event is an unexpired event.

4. The system of claim 1, wherein the operations further comprise:
   updating stream cut data associated with the data stream.

5. The system of claim 1, wherein the copying the unexpired log events to the destination segments associated with the data stream comprises, for a selected log event, determining a selected destination segment based on a routing key extracted from payload data of the event payload data corresponding to the selected log event.

6. The system of claim 5, wherein the determining the selected destination segment based on the routing key comprises generating the routing key based on a cluster node field and a component field in the payload data corresponding to the selected log event.

7. The system of claim 1, wherein part of the source segments is maintained in a data chunk, and wherein the operations further comprise:
   determining a data chunk expiration time, evaluating the data chunk expiration time relative to the current time, and, in response to determining that the data chunk expiration time is prior to the current time, determining that the data chunk contains no unexpired log events, and deleting the data chunk as part of deleting the source segments.

8. The system of claim 7, wherein the determining the data chunk expiration time comprises obtaining system metadata corresponding to a most recent creation time among ones of the log events in the data chunk, and determining a longest expiration period among the ones of the log events in the data chunk.

9. The system of claim 8, wherein the determining the longest expiration period among the ones of the log events in the data chunk comprises maintaining a dataset comprising distinct logging levels of ones of the log events in the data chunk.

10. The system of claim 1, wherein the operations further comprise:
    waiting, based on a reader of one or more of the source segments, before the deleting the source segments.

11. A method, comprising:
    scanning, via a streaming data storage system comprising a processor, source segments of a data stream to determine unexpired log events of log events in the data stream, the scanning comprising determining respective expiration periods of respective log events in the data stream, and copying log events that have expiration periods that expire later than a time of the scanning to destination segments associated with the data stream, wherein the respective log events comprise respective creation times, wherein respective log event types are associated with the respective expiration periods that identify when the respective log events expire, and wherein a first expiration period of the respective expiration periods differs from a second expiration period of the respective expiration periods;
    halting the scanning in response to reaching a log event of the log events that comprises a creation time of the respective creation times that is more recent than an expiration time that is specified by a minimal data stream expiration period; and
    deleting, via the streaming data storage system, the source segments, wherein a first source segment of the source segments comprises an expired log event of the respective log events, and wherein copying the expired log event is omitted prior to deleting the source segments.

12. The method of claim 11, wherein the determining the respective expiration periods of the respective log events comprises obtaining the respective creation times and respective logging levels from respective log event data of the respective log events, and wherein the respective logging levels map to expiration data associated with the data stream.

13. The method of claim 11, further comprising:
    determining, for a selected log event, a destination segment based on at least one of: a cluster node field in data of the selected log event, or a component field in the data of the selected log event.

14. The method of claim 11, wherein part of the source segments is maintained as log events of the log events in a data chunk, and further comprising:

determining a data chunk expiration time, evaluating the data chunk expiration time relative to a current time, and, in response to determining that the data chunk expiration time is prior to the current time, determining that the data chunk contains no unexpired log events, and deleting the data chunk as part of deleting the source segments.

15. The method of claim 14, wherein the determining the data chunk expiration time comprises obtaining system metadata corresponding to a most recent creation time of log events in the data chunk, and determining a longest expiration period of the log events in the data chunk based on evaluating a dataset comprising distinct logging levels of the log events in the data chunk, and wherein respective distinct logging levels of the distinct logging levels map to the respective expiration periods associated with the data stream.

16. A non-transitory machine-readable medium, comprising executable instructions that, when executed by a processor of a streaming data storage system, facilitate performance of operations, the operations comprising:

processing a data stream source segment of log events to determine unexpired events and expired events based on event payload data of the log events, wherein respective log events of the log events are associated with respective expiration periods that identify when the respective log events expire, and wherein a first expiration period of the respective expiration periods differs from a second expiration period of the respective expiration periods;

halting the processing upon reaching a log event of the log events that comprises a creation time that is more recent than an expiration time indicated by a predetermined minimal data stream expiration period;

copying the unexpired events to a data stream destination segment; and deleting the data stream source segment, wherein the data stream source segment comprises an expired event of the expired events.

17. The non-transitory machine-readable medium of claim 16, wherein the processing the data stream source segment comprises, for each log event, extracting an event creation time based on an event logging time in the event payload data, and extracting, from the event payload data, a logging level that maps to an expiration period associated with the data stream source segment.

18. The non-transitory machine-readable medium of claim 16, wherein part of the data stream source segment is maintained as ones of the log events in a data chunk, and wherein the operations further comprise:

determining a data chunk expiration time based on a most recent creation time among the log events in the data chunk and distinct logging levels of the log events in the data chunk, evaluating the data chunk expiration time relative to a current time, and, in response to determining that the data chunk expiration time is prior to the current time, determining that the data chunk contains no unexpired log events, and deleting the data chunk as part of deleting the data stream source segment.

19. The non-transitory machine-readable medium of claim 16, wherein the operations further comprise:

selecting the data stream destination segment based on the event payload data.

20. The non-transitory machine-readable medium of claim 16, wherein the determining the unexpired events and the expired events based on the event payload data comprises:

for a selected event, determining an event expiration period based on a event creation time and a logging level of the selected event; and in response to the current time being within the event expiration period, determining that the selected event is an unexpired event.

\* \* \* \* \*